(12) United States Patent
Oh et al.

(10) Patent No.: US 12,022,195 B2
(45) Date of Patent: Jun. 25, 2024

(54) CAMERA DEVICE CALIBRATION METHOD USING SAMPLINGPOINTS AND CAMERA MODULE

(71) Applicant: LG INNOTEK CO., LTD., Seoul (KR)

(72) Inventors: Jun Seok Oh, Seoul (KR); Min Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 934 days.

(21) Appl. No.: 17/044,770

(22) PCT Filed: Apr. 5, 2019

(86) PCT No.: PCT/KR2019/004038
§ 371 (c)(1),
(2) Date: Oct. 1, 2020

(87) PCT Pub. No.: WO2019/194621
PCT Pub. Date: Oct. 10, 2019

(65) Prior Publication Data
US 2021/0377451 A1 Dec. 2, 2021

(30) Foreign Application Priority Data
Apr. 5, 2018 (KR) .......................... 10-2018-0039977

(51) Int. Cl.
*H04N 23/69* (2023.01)
*G02B 7/10* (2021.01)
(Continued)

(52) U.S. Cl.
CPC .............. *H04N 23/69* (2023.01); *G02B 7/10* (2013.01); *G03B 13/18* (2013.01); *H04N 23/55* (2023.01); *G03B 2205/0053* (2013.01)

(58) Field of Classification Search
CPC ........ H04N 23/69; H04N 23/55; H04N 23/67; H04N 17/002; G02B 7/10; G02B 7/09;
(Continued)

(56) References Cited

U.S. PATENT DOCUMENTS 8,781,313 B2 7/2014 Uchiyama
8,908,085 B2 12/2014 Yamanaka
(Continued)

FOREIGN PATENT DOCUMENTS

CN 103424954 A 12/2013
CN 104049437 A 9/2014
(Continued)

*Primary Examiner* — Usman A Khan
(74) *Attorney, Agent, or Firm* — Birch, Stewart, Kolasch & Birch, LLP

(57) ABSTRACT

A camera device calibration method according to one embodiment comprises the steps of: acquiring first data including location values of a first zoom lens and location values of a first focus lens, corresponding to the location values of the first zoom lens; setting at least two location points of the first zoom lens; acquiring at least two location values, which correspond to the location values of the first focus lens corresponding to at least two location points of the first zoom lens; acquiring second data corresponding to a value between at least two location values of the first zoom lens; and setting, in a camera including the first zoom lens and the first focus lens, at least two location values of the first zoom lens and the first focus lens when a difference value, which is acquired by comparing the first data with the second data, is within a preset threshold range.

11 Claims, 23 Drawing Sheets

(51) Int. Cl.
   *G03B 13/18* (2021.01)
   *H04N 23/55* (2023.01)
(58) Field of Classification Search
   CPC ............ G03B 13/18; G03B 2205/0053; G03B 2205/0046; G03B 13/36; G03B 30/00; G03B 43/00; G03B 5/00; G03B 17/12
   USPC ...................................................... 348/207.1
   See application file for complete search history.

(56) References Cited

U.S. PATENT DOCUMENTS

| | | | |
|---|---|---|---|
| 9,509,943 B2 | 11/2016 | Uchiyama | |
| 2007/0052835 A1 | 3/2007 | Onozawa | |
| 2012/0008037 A1* | 1/2012 | Yamanaka | H04N 23/673 |
| | | | 348/E5.045 |
| 2013/0120618 A1* | 5/2013 | Wang | H04N 23/69 |
| | | | 348/240.99 |
| 2014/0009636 A1 | 1/2014 | Lee et al. | |
| 2015/0156422 A1* | 6/2015 | Neufeld | H04N 23/635 |
| | | | 348/240.3 |
| 2015/0248584 A1 | 9/2015 | Greveson et al. | |
| 2018/0039156 A1 | 2/2018 | Moon et al. | |

FOREIGN PATENT DOCUMENTS

| | | |
|---|---|---|
| JP | 2000-258680 A | 9/2000 |
| JP | 4016488 B2 | 12/2007 |
| JP | 2012-22037 A | 2/2012 |
| JP | 2017-203916 A | 11/2017 |
| KR | 10-2004-0039913 A | 5/2004 |
| KR | 10-0780202 B1 | 11/2007 |
| KR | 10-0858393 B1 | 9/2008 |
| KR | 10-1293245 B1 | 8/2013 |
| KR | 10-2014-0007529 A | 1/2014 |
| KR | 10-2016-0104236 A | 9/2016 |

* cited by examiner

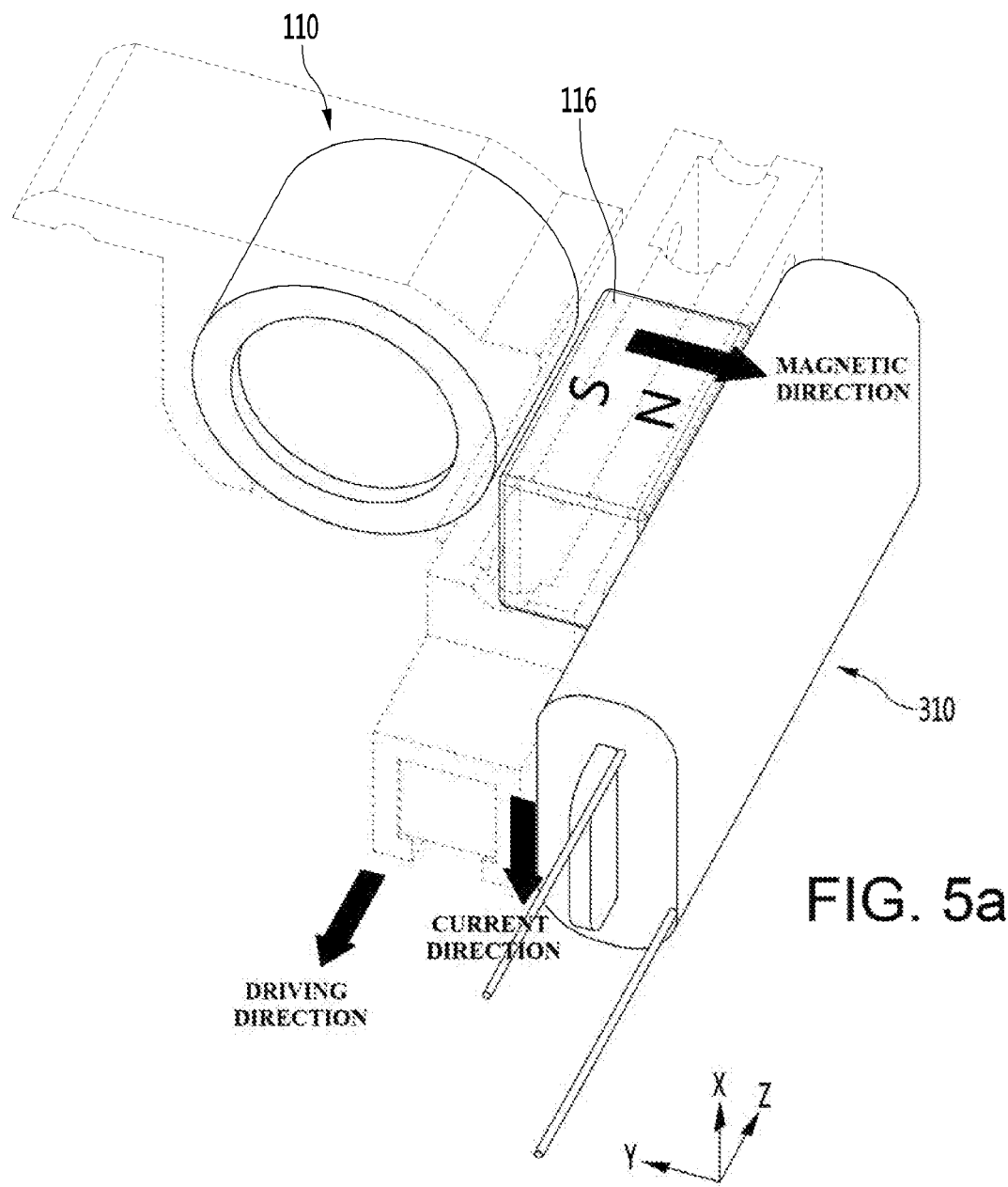

CAMERA DEVICE CALIBRATION METHOD USING SAMPLINGPOINTS AND CAMERA MODULE

CROSS REFERENCE TO RELATED APPLICATIONS

This application is the National Phase of PCT International Application No. PCT/KR2019/004038, filed on Apr. 5, 2019, which claims priority under 35 U.S.C. 119(a) to Patent Application No. 10-2018-0039977, filed in the Republic of Korea on Apr. 5, 2018, all of which are hereby expressly incorporated by reference into the present application.

TECHNICAL FIELD

Embodiments relate to a camera device calibration method.

BACKGROUND ART

A camera module performs a function of photographing a subject and storing it as an image or a moving image, and is mounted on a mobile terminal such as a mobile phone, a laptop a drone, a vehicle, and the like.

Meanwhile, an ultra-small camera module is built into a portable device such as a smartphone, a tablet PC, and a notebook, and such a camera module may perform an autofocus (AF) function adjusting automatically a distance between an image sensor and a lens to adjust a focal length of the lens.

Recently, a camera module may perform a zooming function of zooming up or zooming out photographing a subject by increasing or decreasing a magnification of a long-distance subject through a zoom lens.

Such a camera module includes a zoom lens and a focus lens, and accordingly, includes a zoom actuator for moving the zoom lens, a focus actuator for moving the focus lens, a driver for controlling the zoom actuator and the focus actuator, and a storage unit for storing position information of the zoom lens and the focus lens.

The camera module having the zooming function as described above should automatically focus in response to a change in zoom magnification. However, as the zoom magnification of the zoom lens increases, a stroke of the zoom actuator becomes longer, and a stroke of the focus actuator becomes longer accordingly, and thus there is a problem that an autofocus progress speed becomes slow due to the long stroke.

Therefore, recently, calibration data is stored in the storage unit as described above, and the zoom lens and the focus lens of the camera module are moved by using the calibration data to provide a fast autofocus progress speed.

In this case, in order to provide the above functions, it is necessary to store calibration data corresponding to a focus range according to all zoom arrangements in the storage unit. However, as described above, the focus range is classified according to a distance to an object (macro, infinity, etc.). Accordingly, in the related art, all data for a location value of the zoom lens and a location value of the focus lens according to all distances should be stored in the storage unit, and thus there is a problem in that a memory size is increased and a manufacturing cost is increased.

In addition, in the manufacturing process of the camera module, there is a limit in specifying data according to all magnifications, and thus there is a problem in that data accuracy is lowered.

In addition, the actuator for moving the zoom lens and the focus lens is configured based on a spring or a ball. In addition, in the spring or ball-based, characteristic such as a force (or elasticity) are changed according to a number of times of use, and thus there is a problem that movement accuracy of a lens is lowered.

DISCLOSURE

Technical Problem

The present invention provides a camera module capable of minimizing data related to lens movement stored in a memory, and an operation method thereof.

In addition, the present invention is to provide a camera module capable of improving movement accuracy of a lens by using minimum data, and an operation method thereof.

In addition, the present invention is to provide a camera module capable of updating previously stored data based on data corresponding to an accurate focus position in consideration of characteristics that change according to a number of times of use of an actuator, and an operation method thereof.

Technical problems to be solved by the proposed embodiments are not limited to the above-mentioned technical problems, and other technical problems not mentioned may be clearly understood by those skilled in the art to which the embodiments proposed from the following descriptions belong.

Technical Solution

A camera device calibration method according to an embodiment includes: acquiring first data including location values of a first zoom lens and location values of a first focus lens corresponding to the location values of the first zoom lens; setting at least two location points of the first zoom lens; acquiring at least two location values corresponding to the location values of the first focus lens corresponding to the at least two location points of the first zoom lens; acquiring second data corresponding to a value between at least two location values of the first zoom lens; and setting the at least two location values of the first zoom lens and the first focus lens to a camera including the first zoom lens and the first focus lens when a difference value, which is acquired by comparing the first data with the second data, is within a preset threshold range.

In addition, a camera device calibration method according to an embodiment includes: acquiring a first image at a first location of a zoom lens and a first location of a focus lens with respect to data stored in a camera; acquiring a second image by changing the focus lens from the first location to a second location at the first location of the zoom lens; comparing a difference value between contrast of the first image and contrast of the second image; and updating a location value of the focus lens to the second location value when the difference value of the contrast is out of a preset threshold range.

In addition, the second image has contrast higher than that of the first image.

In addition, a camera device calibration method according to an embodiment includes: acquiring actual data including location values of a zoom lens and location values of a focus lens corresponding to the location values of the zoom lens; setting at least two location points of location points of the zoom lens included in the actual data as a sampling point; acquiring sampling data including the location value of the zoom lens and the location value of the focus lens at the sampling point by using the actual data; acquiring interpolated data including the location value of the zoom lens and the location value of the focus lens of other location points excluding the sampling point by using the sampling data; when a difference value between the actual data and the location values of the focus lens included in the interpolated data is within a preset first threshold range, storing the acquired sampling data; and acquiring an image by moving a location of the zoom lens and a location of the focus lens by using the stored sampling data.

In addition, the calibration method further includes acquiring design data on a locational relationship between the zoom lens and the focus lens that is determined at the time of designing the zoom lens and the focus lens, wherein the design data is theoretical data including the location values of the zoom lens and the location values of the focus lens corresponding to the location values of the zoom lens.

In addition, the acquiring of the actual data includes moving the zoom lens or the focus lens by applying any one of the location value of the zoom lens and the location value of the focus lens included in the design data; adjusting a location of the other focus lens or the zoom lens to an optimum focusing location according to movement of the zoom lens or the focus lens, and acquiring the location value of the focus lens or the location value of the zoom lens of which the location has been adjusted.

In addition, each of the design data, the actual data, and the sampling data is configured to a plurality of pieces of data according to a distance to a subject.

In addition, the moving of the zoom lens or the focus lens includes, when the actual data corresponding to a distance of a first subject is acquired, moving the zoom lens by applying the location value of the zoom lens included in the design data, and when the actual data corresponding to a distance of a second subject different from the distance of the first subject is acquired, moving the focus lens by applying the location value of the focus lens included in the design data.

In addition, the camera device calibration method further includes setting of a distance between location points of the zoom lens, wherein a location and a number of the set location points are changed according to the set distance.

In addition, the camera device calibration method further includes changing the location and the number of the sampling points by resetting the distance of the location points when the difference value is out of the first threshold range.

In addition, the acquiring of the interpolated data includes acquiring the interpolated data by applying any one of a plurality of interpolations, and when the difference value is out of the first threshold range, reacquiring the interpolated data is further included by applying an interpolation other than the applied interpolation.

In addition, the acquiring of the image includes extracting sampling data corresponding to a distance to a subject to be photographed from the stored sampling data, acquiring interpolated data by interpolating the extracted sampling data, and acquiring a first image by moving the zoom lens and the focus lens based on the acquired interpolated data.

In addition, the camera device calibration method further includes: acquiring a second image by re-moving the location of the focus lens moved with respect to the interpolated data to an optimum focusing location; comparing a difference value between contrast of the first image and contrast of the second image; and updating the location value of the focus lens with respect to a location point of the corresponding zoom to the removed location value when the difference value of contrast deviates from a preset second threshold range.

Meanwhile, a camera module according to an embodiment includes: a zoom lens for adjusting a zoom magnification of a subject; a focus lens for adjusting a focus of the subject; a first lens driving unit for moving a location of the zoom lens; a second lens driving unit for moving a location of the focus lens; a storage unit for storing sampling data composed of a location value of the zoom lens of a part of sampling points among location points of the zoom lens and a location value of the focus lens corresponding to the same, and a control unit for acquiring the sampling data corresponding to the sampling point to store it in the storage unit and moving the locations of the zoom lens and the focus lens based on the interpolated data acquired by interpolating the stored sampling data, wherein the control unit acquires design data on a locational relationship between the zoom lens and the focus lens determined at the time of designing the zoom lens and the focus lens, acquires actual data including the location values of the zoom lens and the location values of the focus lens corresponding to the location values of the zoom lens by using the design data, sets at least two location points of location points of the zoom lens included in the actual data as sampling points, acquires sampling data including the location value of the zoom lens and the location value of the focus lens at the sampling point by using the actual data, acquires interpolated data including the location value of the zoom lens and the location value of the focus lens of other location points excluding the sampling point by using the sampling data, and when a difference value between the location values of the focus lens included in the actual data and the interpolated data is within a preset first threshold range, stores the acquired sampling data in the storage unit.

In addition, each of the design data, the actual data, and the sampling data is composed of a plurality of pieces of data according to a distance to the subject, and when the control unit acquires actual data corresponding to a distance of a first subject, the control unit applies the location value of the zoom lens included in the design data to move the zoom lens, and adjusts the location of the focus lens to an optimum focusing location according to the movement of the zoom lens to acquire the actual data, and when the control unit acquires actual data corresponding to a distance of a second subject, which is different from the distance of the first subject, the control unit moves the focus lens by applying the location value of the focus lens included in the design data, and adjusts the location of the zoom lens to the optimum focusing location according to the movement of the focus lens to acquire the actual data.

In addition, when the difference value is out of the preset first threshold range, the control unit changes the location and the number of the sampling points, or changes the interpolation used for acquiring the interpolated data to reacquire the interpolated data.

In addition, when a difference value between contrast of a first image acquired based on the interpolated data and contrast of a second image acquired according to an auto-focusing operation is out of a preset second threshold range, the control unit updates the interpolated data with the location value of the zoom lens and the location value of the focus lens applied at the time of acquiring the second image.

Advantageous Effects

In an embodiment according to the present invention, only sampling data corresponding to a location value of a zoom lens and a location value of a focus lens corresponding to a specific sampling point is stored in a memory. Accordingly, in the present invention, it is possible to minimize a size of the memory, thereby reducing a manufacturing cost.

In addition, in the embodiment according to the present invention, interpolated data for points other than sampling points is acquired by using an interpolation. Then, the sampling points are adjusted based on a difference between the interpolated data and the actual data. At this time, the sampling points may be adjusted by adjusting a sampling interval to adjust a number of sampling points accordingly. In addition, in a usage environment of a camera module, an auto focusing function is provided by applying the interpolated data in which the difference from the actual data is minimized. Therefore, in the present invention, a lens may be moved to an accurate position even with minimum sampling data by performing the auto focusing function using the interpolated data that is not different from the actual data, thereby improving reliability of a product.

In addition, according to the embodiment of the present invention, when the auto focusing function is performed, it is determined whether or not interpolated data is abnormal based on contrast of an image. Then, when the contrast of the image acquired by applying the interpolated data is out of a preset allowable range, the previously stored data is updated to a new location value of the zoom lens and a location value of the focus lens corresponding thereto. Therefore, in the present invention, accuracy of the focus position may be improved without being affected by operating characteristics that change according to a number of times of using the camera module.

DESCRIPTION OF DRAWINGS

FIG. 5A is a conceptual diagram of a first magnetization method of a magnet of the camera module according to the embodiment shown in FIG. 3B.

MODES OF THE INVENTION

Hereinafter, the embodiment will be described in detail with reference to the accompanying drawings.

Meanwhile, in describing the embodiments, when each element is described with terms "on/under" or "above/below", the terms "on/under" or "above/below" may include both meanings that two elements are in direct contact with each other, or one or more other components are disposed between the two elements to form. Further, when expressed as "on/under" or "above/below", it may include not only the upper direction but also the lower direction based on one element.

In addition, relational terms such as "on/above" and "under/below" used below do not necessarily require or imply any physical or logical relationship or order between such components or elements, and may be used to distinguish any component or element from another component or element.

In addition, in describing the embodiments, the terms "first," "second," etc. may be used to describe various elements, but these terms are only used to distinguish one element from another. In addition, terms defined specially in consideration of a configuration and operation of the embodiment are only for describing the embodiment, and do not limit the scope of the embodiment.

Figure 1:
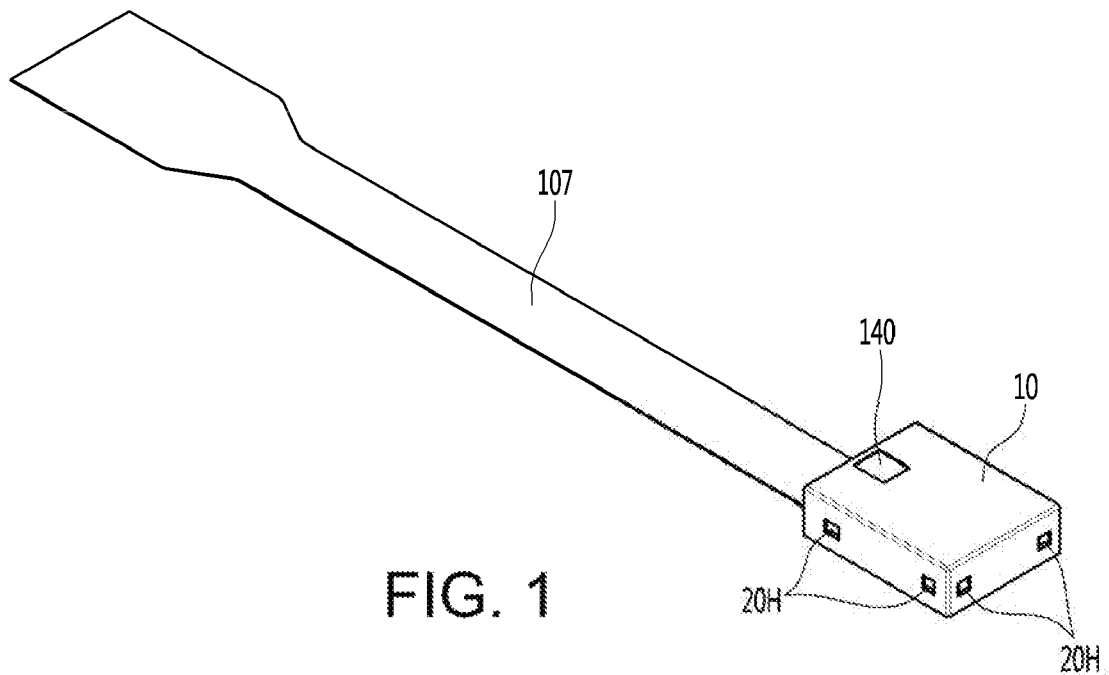
FIG. 1 is a perspective view of a camera module according to an embodiment.
Figure 2:
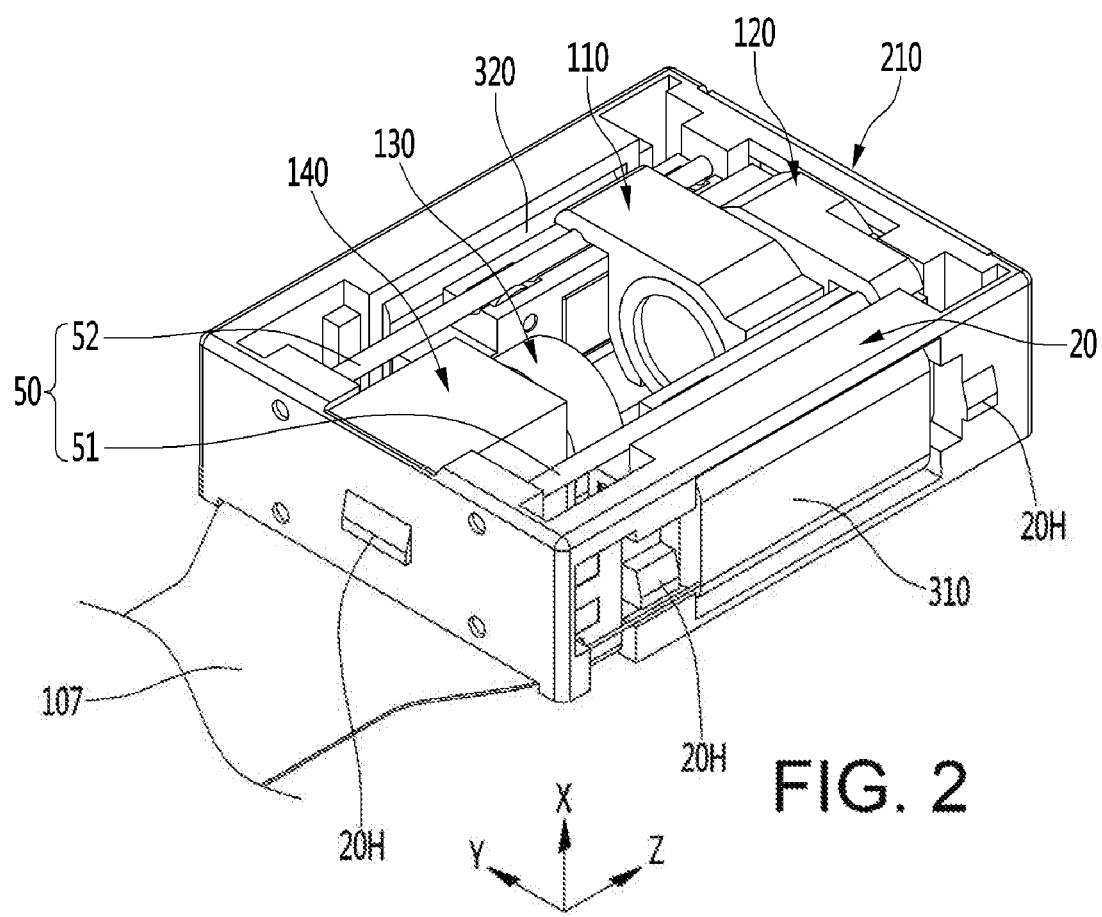
FIG. 2 is a perspective view in which a cover is removed from the camera module according to the embodiment shown in FIG. 1.

FIG. 1 is a perspective view of a camera module 100 according to an embodiment, and FIG. 2 is a perspective view in which a cover 10 is removed from the camera module 100 according to the embodiment shown in FIG. 1.

First, referring mainly to FIG. 1, in the camera module 100 according to the embodiment, various optical systems may be coupled to a predetermined mount 20 (see FIG. 2). For example, a prism 140 and lens groups are disposed on the mount 20, and the cover 10 may be coupled via a hook 20H of the mount 20.

The cover 10 may be coupled to the mount 20. The cover 10 may cover a part accommodated in the mount 20, thereby protecting components of the camera module. The mount 20 may be referred to as a base.

The cover 10 may be coupled to be fitted to the mount 20. In addition, the cover 10 may be coupled to the mount 20 by an adhesive. For example, a hook 20H may protrude from a side surface of the mount 20, and the cover 10 has a hole formed at a position corresponding to the hook H, and the hook of the mount 20 is mounted in the hole of the cover 10 so that the cover 10 and the mount 20 may be coupled to each other. In addition, the cover 10 may be stably coupled to the mount 20 by using the adhesive.

In addition, a circuit board 107 may be disposed at a lower side of the mount 20, and the circuit board 107 may be electrically connected to lens driving units disposed inside the mount 20.

Next, referring to FIG. 2, the camera module 100 according to the embodiment may have an optical system and a lens driving unit disposed on the mount 20. For example, the camera module 100 according to the embodiment may include at least one of a first lens assembly 110, a second lens assembly 120, a third lens group 130, a prism 140, a first driving unit 310, a second driving unit 320, a rod 50, and an image sensor unit 210.

The first lens assembly 110, the second lens assembly 120, the third lens group 130, the prism 140, the image sensor unit 210, and the like may be classified into the optical system.

In addition, the first driving unit 310, the second driving unit 320, the rod 50, etc. may be classified into the lens driving unit, and the first lens assembly 110 and the second lens assembly 120 also have a function of the lens driving unit. The first driving unit 310 and the second driving unit 320 may be a coil driving unit, but the embodiment is not limited thereto.

The rod 50 may perform a guiding function of a lens assembly to be moved, and may be provided in singular or plural. For example, the rod 50 may include a first rod 51 and a second rod 52, but the embodiment is not limited thereto.

In an axial direction illustrated in FIG. 2, a Z-axis refers to an optical axis direction or a parallel direction thereof. A Y-axis refers to a direction perpendicular to the Z-axis on the ground (YZ plane). An X-axis refers to a direction perpendicular to the ground.

In the embodiment, the prism 140 changes incident light to parallel light. For example, the prism 140 changes an optical path of the incident light to an optical axis (Z) parallel to a central axis of a lens group to change the incident light to the parallel light. Thereafter, the parallel light may pass through the third lens group 130, the first lens assembly 110, and the second lens assembly 120 to be incident on the image sensor unit 210 so that an image may be captured.

Hereinafter, in the description of the embodiment, a case in which moving lens groups are two will be described, but the embodiment is not limited thereto, and the moving lens groups may be three, four, five or more. In addition, the optical axis direction (Z) refers to a direction that is the same as or parallel to a direction in which the lens groups are arranged.

The camera module according to the embodiment may perform a zooming function. For example, in the embodiment, the first lens assembly 110 and the second lens assembly 120 may be a moving lens that moves via the first driving unit 310, the second driving unit 320, and the rod 50, and the third lens group 130 may be a fixed lens.

For example, in the embodiment, the first lens assembly 110 and the second lens assembly 120 may include the moving lens group, and the third lens group 130 may be a fixed lens group.

The third lens group 130 may perform a function of a focator that images the parallel light at a specific location.

In addition, the first lens assembly 110 may perform a function of a variator that re-images the image formed in the third lens group 130 which is the focator at a different location. Meanwhile, in the first lens assembly 110, a change in magnification may be large because a distance to a subject or an image distance is changed a lot, and the first lens assembly 110, which is the variator, may play an important role in a focal length or the magnification change of the optical system.

Meanwhile, an image point imaged by the first lens assembly 110, which is the variator, may differ slightly depending on the location.

Accordingly, the second lens assembly 120 may perform a location correction function for the image imaged by the variator. For example, the second lens assembly 120 may perform a function of a compensator that accurately images the image point imaged in the first lens assembly 110 which is the variator at an actual location of the image sensor unit 210.

For example, the first lens assembly 110 may be a zoom lens assembly that performs a zooming function, and the second lens assembly 120 may be a focus lens assembly that performs a focusing function.

Hereinafter, features of the camera module according to the embodiment will be described in detail with reference to FIGS. 3A to 5D.

Figure 3A:
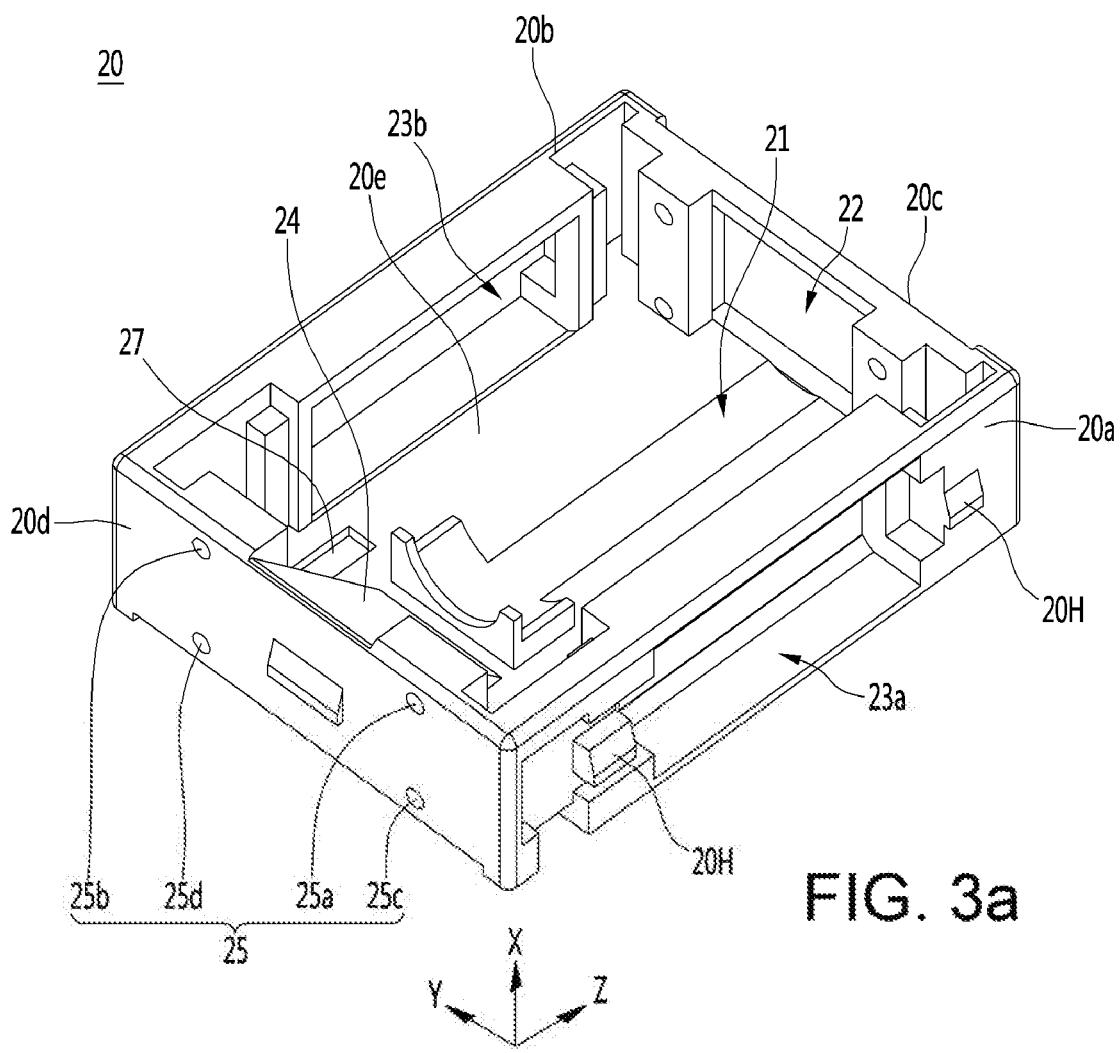
FIG. 3A is a perspective view of a mount of the camera module according to the embodiment shown in FIG. 2.

First, FIG. 3A is a perspective view of the mount 20 in the camera module according to the embodiment shown in FIG. 2. The mount 20 may have a rectangular parallelepiped shape, and may include four side surfaces and a bottom surface 20e. For example, the mount 20 may include first to fourth side surfaces 20a, 20b, 20c, and 20d, and the first side surface 20a and the second side surface 20b, the third side surface 20c, and the fourth side surface 20d may face each other.

The hook 20H may be formed on at least one side surface of the mount 20 to be coupled to the hole of the cover 10.

In addition, a first guide groove 112G in which the first lens assembly 110, the second lens assembly 120, and the third lens group 130 are located may be formed in the optical axis direction (Z) on the bottom surface 20e of the mount 20. The first guide groove 112G may be a concave shape downward according to an outer circumferential shape of the lens, but the embodiment is not limited thereto.

In addition, a first opening portion 23a and a second opening portion 23b in which the first driving unit 310 and the second driving unit 320 are disposed respectively may be formed on the first side surface 20a and the second side surface 20b of the mount 20. In addition, a third opening portion 22 in which the image sensor unit 210 is disposed may be formed on the third side surface 20c of the mount 20.

In addition, a fourth opening portion 27 in which the circuit board 107 is exposed may be formed on the bottom surface of the mount 20 in singular or plural.

In addition, a coupling hole 25 to which the rod 50 is coupled may be formed in the third side surface 20c of the mount 20 and the fourth side surface 20d facing it in singular or plural. For example, a first coupling hole 25a, a second coupling hole 25b, a third coupling hole 25c, and a fourth coupling hole 25d may be formed in the third side surface 20c and the fourth side surface 20d of the mount 20, and a first rod 51, a second rod 52, a third rod 53, and a fourth rod 54 may be coupled thereto, respectively.

In addition, a prism mounting part 24 for disposing the prism 140 may be formed inside the fourth side surface 20d of the mount 20.

A material of the mount 20 may be formed of any one or more of plastic, glass-based epoxy, polycarbonate, metal, and composite material.

Figure 3B:
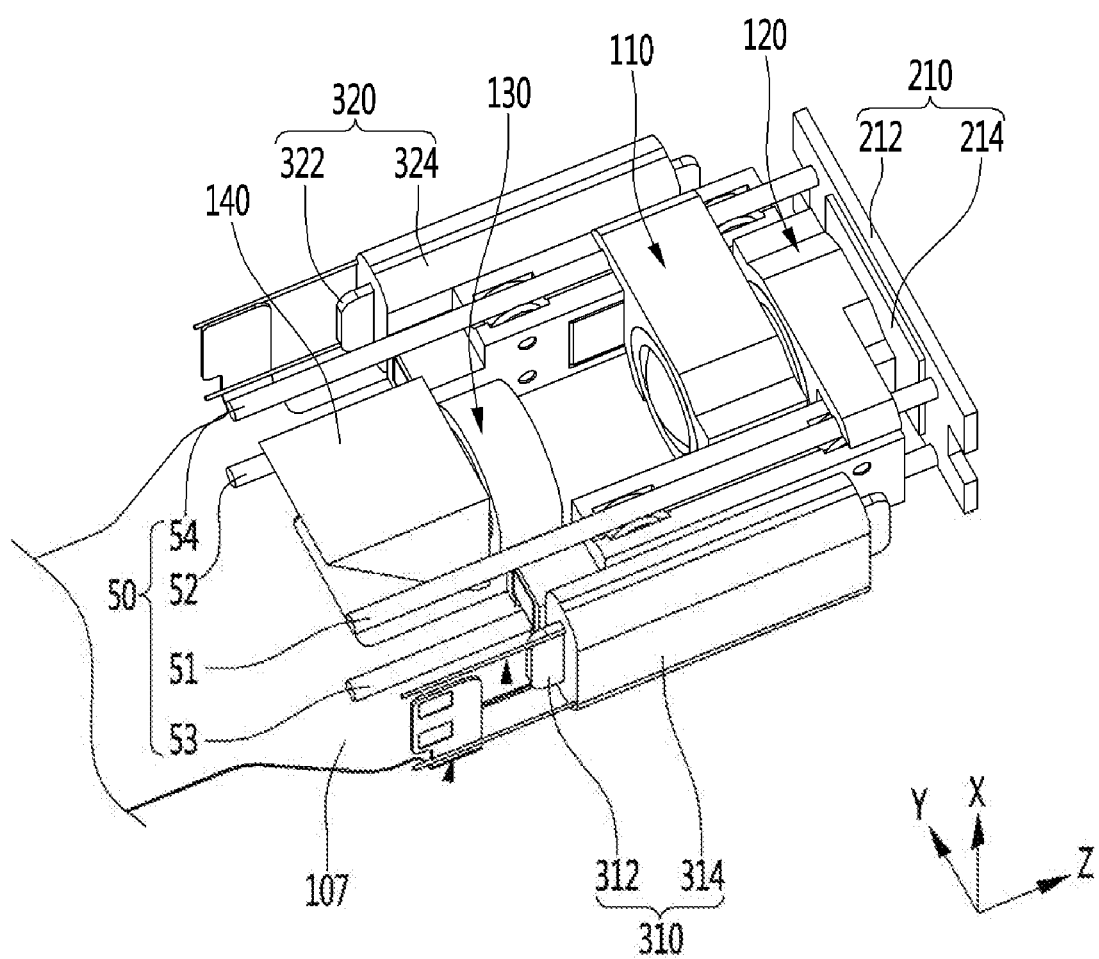
FIG. 3B is a perspective view in which the mount is removed from the camera module according to the embodiment shown in FIG. 2.

Next, FIG. 3B is a perspective view in which the mount 20 is removed from the camera module according to the embodiment shown in FIG. 2, and shows an optical system and a lens driving unit.

In an embodiment, a lens driving device may include a mover and a fixed part. The mover may be referred to as a moving part in a concept corresponding to the fixed part. For example, the mover may refer to a lens assembly that is moved by rolling motion of a wheel. On the other hand, the fixed part may refer to a mount, a rod, etc., which are not moved.

The camera module according to the embodiment may include an optical system such as a prism 140, a first lens assembly 110, a second lens assembly 120, a third lens group 130, and an image sensor unit 210 on the mount 20. In addition, the camera module of the embodiment may include a lens driving unit such as a first driving unit 310, a second driving unit 320, and a rod 50. The first lens assembly 110 and the second lens assembly 120 may also perform a lens driving function.

The rod 50 may include the first to fourth rods 51, 52, 53, and 54, and each of the first to fourth rods 51, 52, 53, and 54 may be coupled to the first coupling hole to the fourth coupling hole 25a, 25b, 25c, and 25d (see FIG. 3A) to perform a function as a movement guide of the first lens assembly 110 and the second lens assembly 120. The rod 50 may be formed of any one or more of plastic, glass-based epoxy, polycarbonate, metal, and composite materials.

The first driving unit 310 may be a coil driving unit, and may have a shape in which a first coil 314 is wound around a first core 312 such as an iron core. In addition, the second driving unit 320 may also be a coil driving unit in which a second coil 324 is wound around a second core 322 such as an iron core.

First, the prism 140 changes incident light into parallel light by changing a light path of the incident light into the optical axis parallel to the central axis Z of the lens group. Thereafter, the parallel light may pass through the third lens group 130, the first lens assembly 110, and the second lens assembly 120 to be captured by the image sensor unit 210.

The prism 140 may be an optical member having a triangular prism shape. In addition, the embodiment may adopt a reflecting plate or a reflecting mirror instead of the prism 140.

In addition, when the image sensor unit 210 is not disposed in a direction perpendicular to the optical axis, the embodiment may further include an additional prism (not shown) for light passing through the lens group to be captured by the image sensor unit 210.

In an embodiment, the image sensor unit 210 may be disposed perpendicular to the optical axis direction of the parallel light. The image sensor unit 210 may include a solid-state imaging device 214 disposed on a second circuit board 212. For example, the image sensor unit 210 may include a charge coupled device (CCD) image sensor or a complementary metal-oxide-semiconductor (CMOS) image sensor.

Figure 4A:
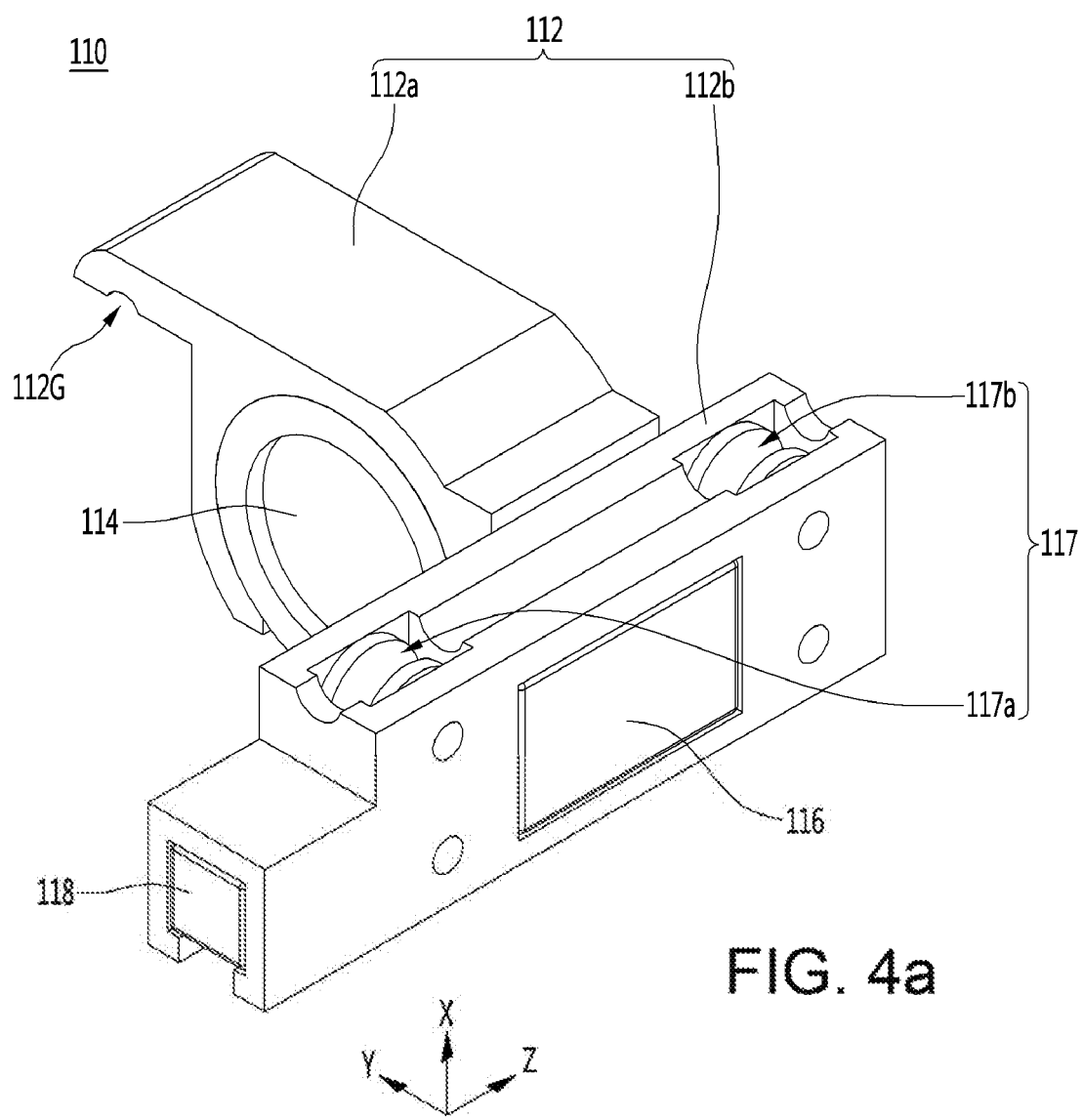
FIG. 4A is a perspective view of a first lens assembly of the camera module according to the embodiment shown in FIG. 2.
Figure 4B:
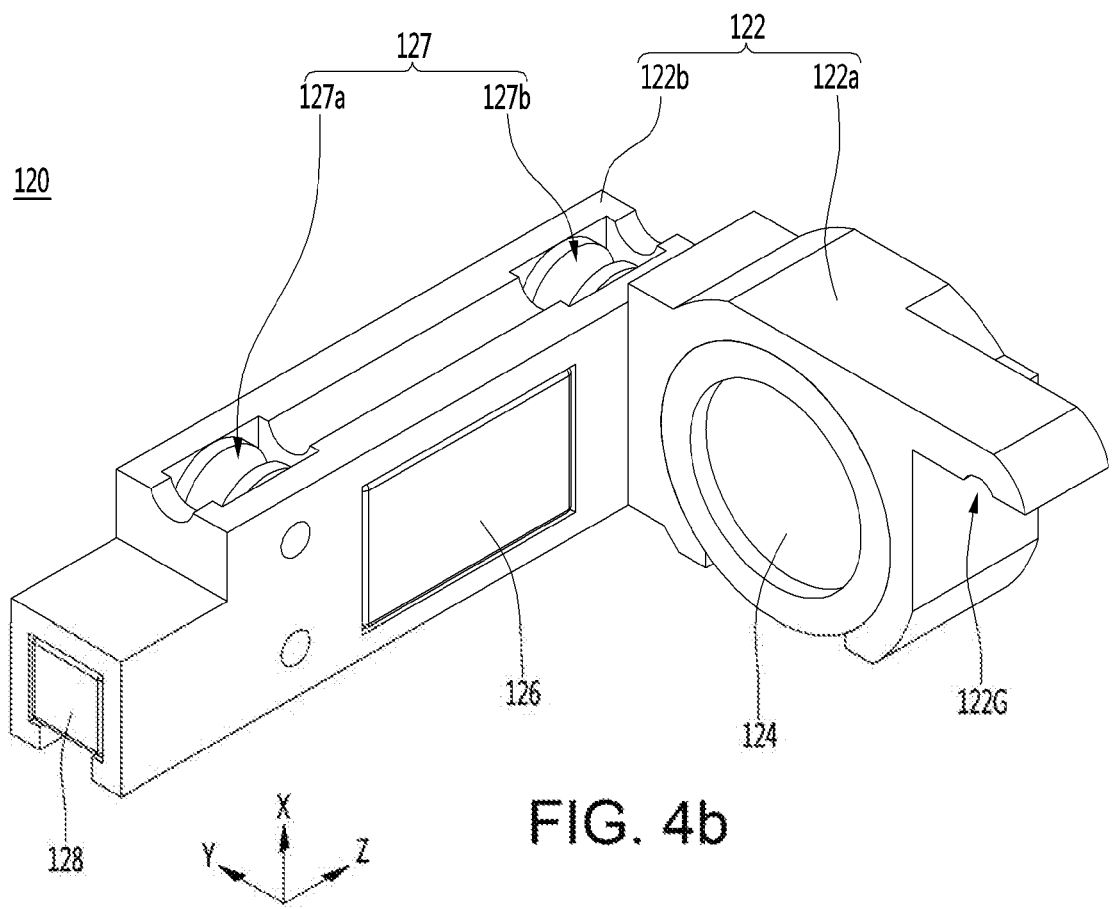
FIGS. 4B and 4C are perspective views of a second lens assembly of the camera module according to the embodiment shown in FIG. 2.
Figure 4C:
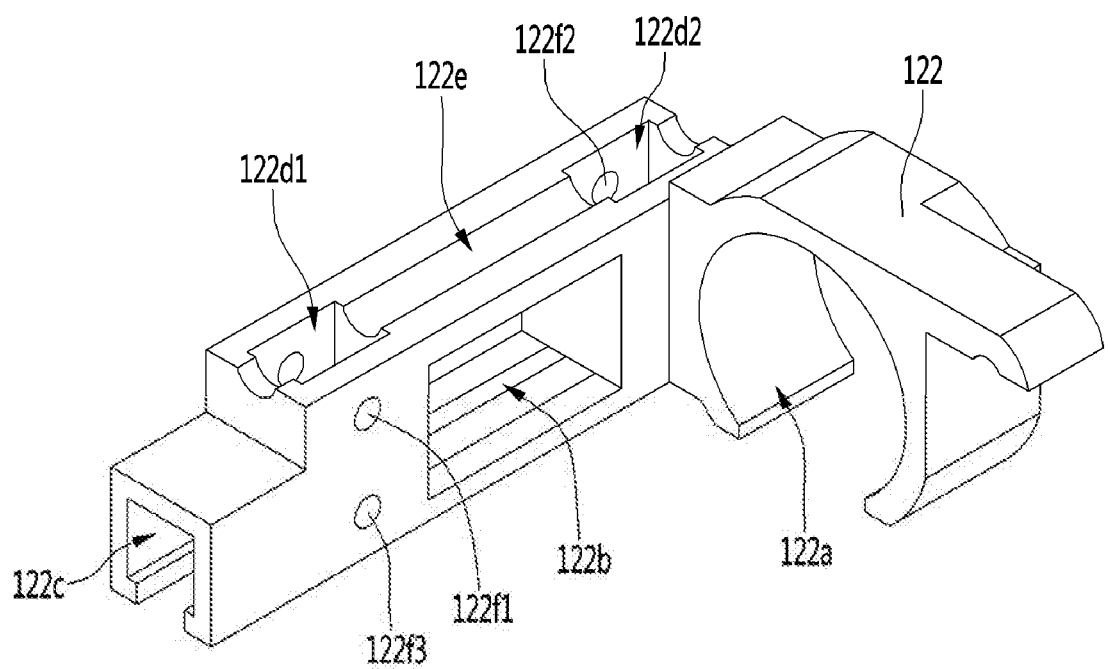

Referring to FIGS. 4A and 4B, the first lens assembly 110 and the second lens assembly 120 will be described in more detail in the embodiment.

FIG. 4A is a perspective view of the first lens assembly 110 in the camera module according to the embodiment shown in FIG. 2, and FIG. 4B is a perspective view of the second lens assembly 120 in the camera module according to the embodiment shown in FIG. 2.

Referring to FIG. 4A, the first lens assembly 110 may include any one or more of a first housing 112, a first lens group 114, a first wheel 117, a third driving unit 116, and a first position sensor 118.

In addition, referring to FIG. 4B, the second lens assembly 120 of the embodiment may include any one or more of a second housing 122, a second lens group 124, a second wheel 127, a fourth driving unit 126, and a second position sensor 128.

Hereinafter, the first lens assembly 110 will be described mainly.

The first housing 112 of the first lens assembly 110 may include a first lens housing 112a and a first driving unit housing 112b. The first lens housing 112a may function as a lens barrel, and the first lens group 114 may be mounted therein. The first lens group 114 may be a moving lens group, and may include a single lens or a plurality of lenses. The second housing 122 of the second lens assembly 120 may also include a second lens housing 122a and a second driving unit housing 122b.

In this case, a first guide groove 112G may be formed at a lower side of one end of the first lens housing 112a of the first lens assembly 110. The first lens assembly 110 may be guided by the first guide groove 112G and may move linearly in the optical axis direction while in sliding contact with the second rod 52. In addition, a second guide groove 122G may also be formed at a lower side of one end of the second lens housing 122a of the second lens assembly 120.

In the embodiment, since the first housing 112 is provided to be moved in the optical axis direction by the sliding contact between the second rod 52 and the first guide groove 112G, a camera module that performs an efficient auto focusing and zooming function may be implemented.

In addition, since the second housing 122 is provided to be moved in the optical axis direction by the sliding contact between the first rod 51 and the second guide groove 122G, a camera module that performs an efficient auto focusing and zooming function may be implemented.

Next, the third driving unit 116, the first wheel 117, and the first position sensor 118 may be disposed in the first driving unit housing 112b of the first lens assembly 110. The first wheel 117 may include a plurality of wheels, and may include a first-first wheel 117a and a first-second wheel 117b.

In addition, a fourth driving unit 126, a second wheel 127, and a second position sensor 128 may also be disposed in the second driving unit housing 122b of the second lens assembly 120. The second wheel 127 may include a plurality of wheels, and may include a second-first wheel 127a and a second-second wheel 127b.

The third driving unit 116 of the first lens assembly 110 may be a magnet driving unit, but the embodiment is not limited thereto. For example, the third driving unit 116 may include a first magnet that is a permanent magnet. In addition, the fourth driving unit 126 of the second lens assembly 120 may also be the magnet driving unit, but the embodiment is not limited thereto.

For example, FIG. 5A is a conceptual diagram of the first magnetization method of the first magnet in the third driving unit 116 of the first lens assembly 110, and an N-pole of the permanent magnet is disposed to face the first driving unit 310, and an S-pole may be located opposite to the first driving unit 310.

In this case, according to the law of the left hand of Fleming, a direction of electromagnetic force may be parallel to the direction of the optical axis to drive the first lens assembly 110.

In particular, in the embodiment, as shown in FIG. 4A, the first lens assembly 110 includes the first wheel 117 which is a rolling driving unit and moves on the rod 50, and accordingly, there is technical effect that an occurrence of friction torque may be minimized.

Thus, the lens assembly, the lens driving device, and the camera module including the same according to the embodiment may improve driving force by minimizing the occurrence of friction torque between the lens assembly and the guide rod that are moved during zooming. Accordingly, according to the embodiment, there are technical effects that power consumption of the camera module during zooming may be reduced and control characteristics may be improved.

Figure 5B:
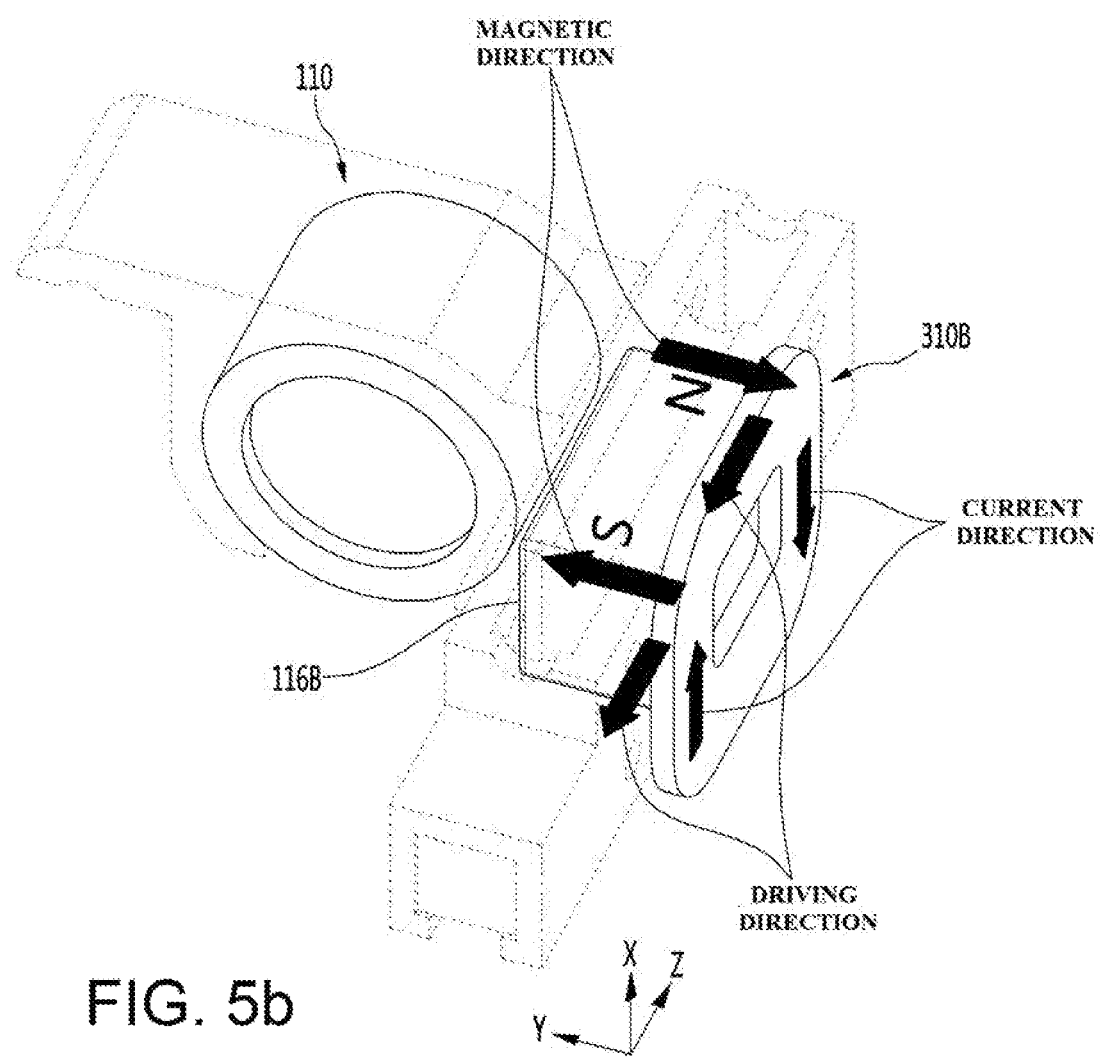
FIG. 5B is a conceptual diagram of a second magnetization method of a magnet of the camera module according to the embodiment shown in FIG. 3A.

Meanwhile, FIG. 5B is a conceptual diagram of a second magnetization method of a magnet which is a first driving unit 116B in a camera module according to an embodiment.

In FIG. 5A, the first driving unit 310 has a shape in which the first coil 314 is wound around the bar-shaped first core 312 (see FIG. 3B). On the other hand, a first-second driving unit 310B shown in FIG. 5B has a shape in which a coil is wound around a donut-shaped core.

Accordingly, a direction of current in a region facing the third driving unit 116 in the first driving unit 310 of FIG. 5A is one direction.

On the other hand, a direction of current in a region facing the third driving unit 116 in the first-second driving unit 310B of FIG. 5B is not the same, and accordingly, both the N-pole and the S-pole of the permanent magnet which is the third-second driving unit 116B may be disposed to face the first-second driving unit 310B.

Referring again to FIG. 4A, the first position sensor 118 may be disposed in the first driving unit housing 112b of the first lens assembly to detect and control the position of the first lens assembly 110. For example, the first position sensor 118 disposed in the first driving unit housing 112b may be disposed to face a first sensing magnet (not shown) disposed on the bottom surface of the mount 20.

In addition, as shown in FIG. 4B, the second position sensor 128 may also be disposed in the second driving unit housing 122b of the second lens assembly to detect and control the position of the second lens assembly 120.

Figure 6:
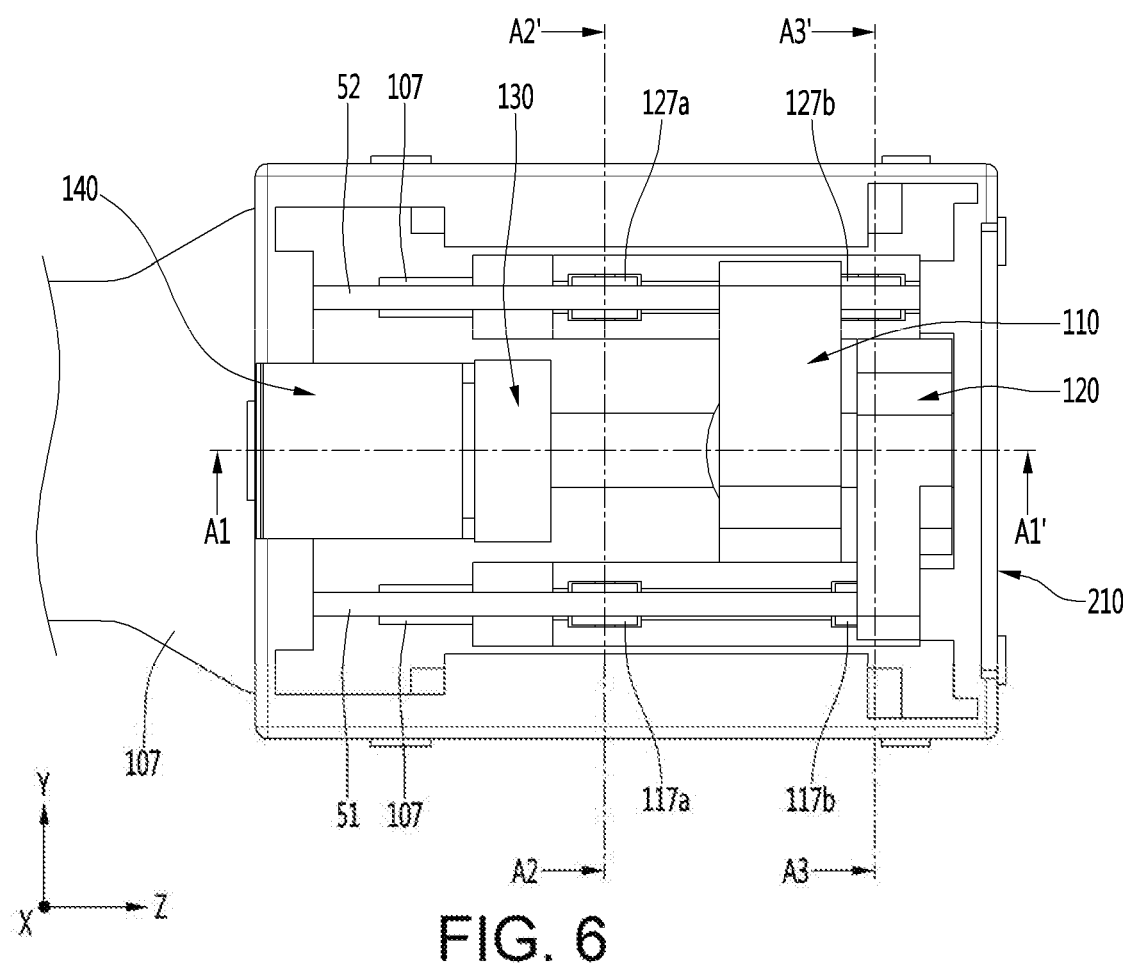
FIG. 6 is a plan view of the camera module according to the embodiment shown in FIG. 2.
Figure 7A:
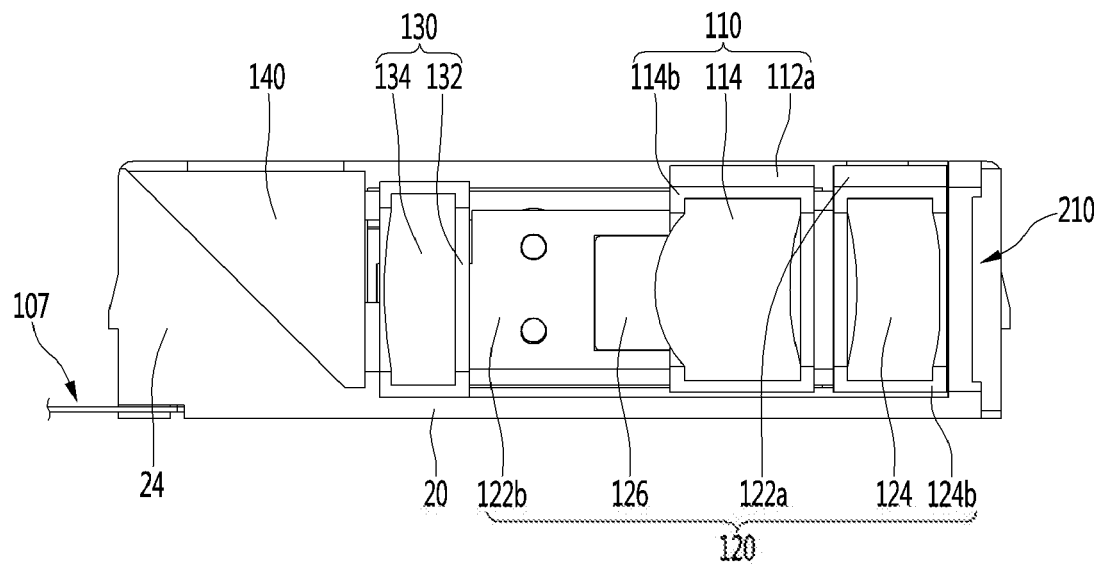
FIG. 7A is a view of a cut plane taken along line A1-A1' of the camera module according to the embodiment shown in FIG. 6.
Figure 7B:
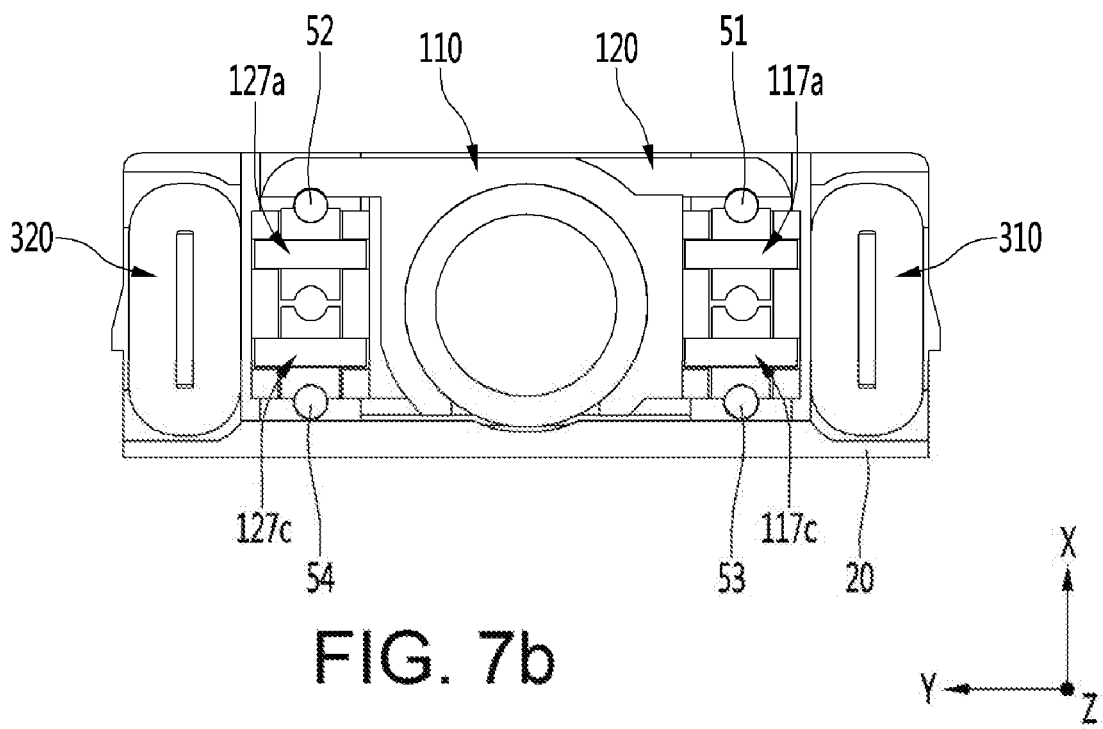
FIG. 7B is a view of a cut plane taken along line A2-A2' of the camera module according to the embodiment shown in FIG. 6.
Figure 7C:
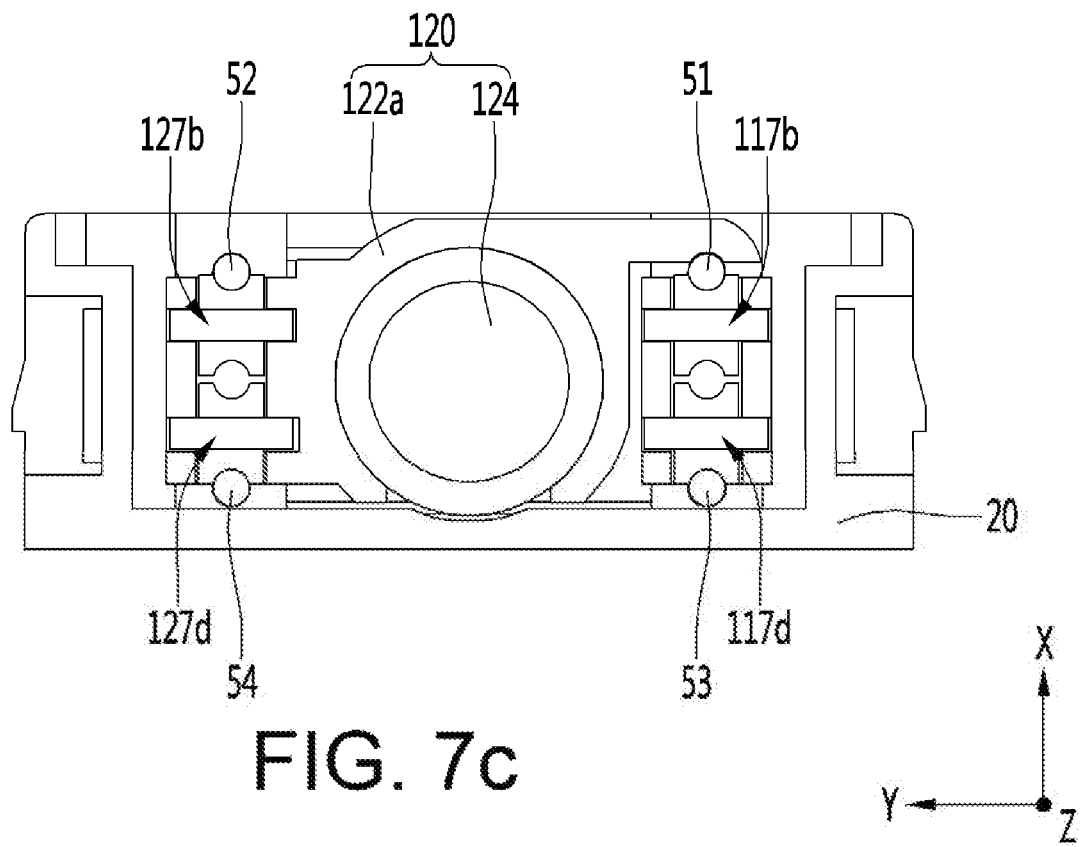
FIG. 7C is a view of a cut plane taken along line A3-A3' of the camera module according to the embodiment shown in FIG. 6.

Next, FIG. 6 is a plan view of the camera module according to the embodiment shown in FIG. 2. In addition, FIG. 7A is a view in which a cut plane taken along line A1-A1' of the camera module according to the embodiment illustrated in FIG. 6 is viewed in a Y-axis direction, FIG. 7B is a view in which a cut plane taken along line A2-A2' of the camera module according to the embodiment illustrated in FIG. 6 is viewed in a Z-axis direction. In addition, FIG. 7C is a view in which a cut plane taken along line A3-A3' of the camera module according to the embodiment illustrated in FIG. 6 is viewed in a Z-axis direction.

First, in FIG. 7A, the second driving unit housing 122 and the fourth driving unit 126 of the second lens assembly 120 are not cut.

Referring to FIG. 7A, a first lens group 114 may be mounted on the first lens housing 112a of the first lens assembly 110. The first lens group 114 may be mounted on a first lens-barrel 114b.

In addition, a second lens group 124 may be mounted on the second lens housing 122a of the second lens assembly 120. The second lens group 124 may be mounted on a second lens-barrel 124b.

In addition, the third lens group 130 may include a third lens 134 mounted on a third lens-barrel 1132.

Each of the first to third lens groups 114, 124, and 134 may include one or a plurality of lenses.

In the camera module according to the embodiment, centers of the prism 140, the third lens group 130, the first lens group 114, and the second lens group 124 may be arranged in the optical axis (Z) direction.

The third lens group 130 may be disposed to face the prism 140, and light emitted from the prism 140 may be incident thereon.

At least any one of the first to third lens groups 114, 124, and 134 may be a fixed lens. For example, the third lens group 130 may be fixedly disposed on the camera module to not move in the optical axis direction, but the embodiment is not limited thereto.

For example, the mount 20 may include a mounting part (not shown) to which the third lens group 130 is fixedly coupled. The third lens group 130 may be mounted on the mounting part and fixed to the mounting part by an adhesive.

The second lens group 124 may be disposed to be spaced apart from the third lens group 130 in the optical axis direction, and may move in the optical axis direction. The third lens group 130 may be disposed to be spaced apart from the second lens group 124 in the optical axis direction, and may move in the optical axis direction.

Light emitted from the third lens group 130 may be incident on the image sensor unit 210 disposed behind the third lens group 130.

A distance between the first lens group 114 and the third lens group 130 and a distance between the first lens group 114 and the second lens group 124 may be adjusted by moving the first lens group 114 and the second lens group 124 in the optical axis direction, and accordingly, the camera module may perform a zooming function.

Next, FIG. 7B is a view in which a cut plane taken along line A2-A2' of the camera module according to the embodiment illustrated in FIG. 6 is viewed in the Z-axis direction, and it illustrates a state in which a first-first wheel 117a and a first-third wheel 117c are cut in the first lens assembly 110 and a second-first wheel 127a and a second-third wheel 127c are cut in the second lens assembly 120.

In the embodiment, the first lens assembly 110 includes the first-first wheel 117a and the first-third wheel 117c which are rolling driving units, and the second lens assembly 120 also includes the second-first wheel 127a and the second-third wheel 127c which are rolling driving units to rolling-move by the electromagnetic force on each of the first rod 51, the third rod 53, the second rod 52, and the fourth rod 54, and accordingly, there is a technical effect that an occurrence of friction torque may be minimized.

Thus, the lens assembly, the lens driving device, and the camera module including the same according to the embodiment may improve driving force by minimizing the occurrence of friction torque between the guide rod 50 and the wheel which is a rolling driving unit of the lens assembly moved in the optical axis (Z) direction during zooming. In addition, according to the embodiment, there are technical effects that power consumption of the camera module during zooming may be reduced and control characteristics may be improved by minimizing an occurrence of frictional resistance between the wheel of the lens assembly and the rod 50.

Next, FIG. 7C is a view in which a cut plane taken along line A3-A3' of the camera module according to the embodiment shown in FIG. 6 is viewed in the Z-axis direction, and it illustrates a state in which the first-second wheel 117*b* and a first-fourth wheel 117*d* are cut in the first lens assembly 110 and the second-second wheel 127*b*, a second-fourth wheels 127*d*, the second lens housing 122*a*, and the second lens group 124 are cut in the second lens assembly 120.

In an embodiment, the first lens assembly 110 includes the first-second wheel 117*b* and the first-fourth wheel 117*d* which are rolling driving units, and the second lens assembly 120 also includes the second-second wheel 127*b* and the second-fourth wheel 127*d* which are rolling driving units to rolling-move on each of the first rod 51, the third rod 53, the second rod 52, and the fourth rod 54, and accordingly, there is a technical effect that an occurrence of friction torque may be minimized.

Thus, according to the embodiment, there are complex technical effects that driving force may be improved, power consumption may be reduced, and control characteristics may be improved by minimizing the occurrence of friction torque between the wheel of the lens assembly and the rod 50 during zooming.

Figure 8:
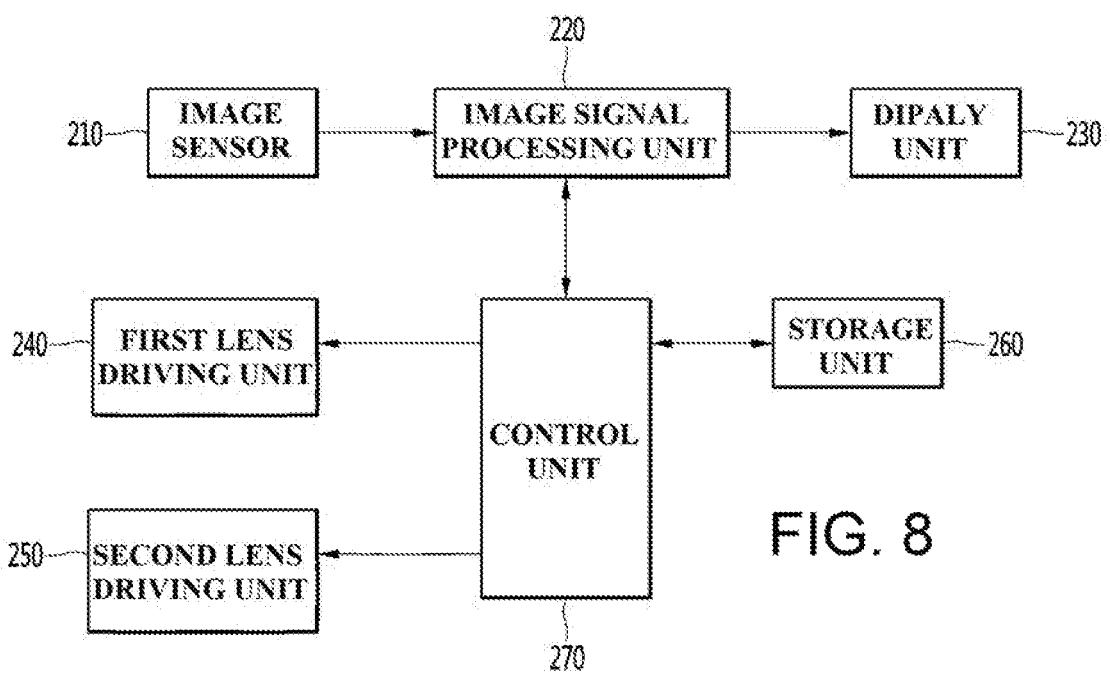
FIG. 8 is a block diagram showing an internal configuration of a camera module according to an embodiment of the present invention.

FIG. 8 is a block diagram showing an internal configuration of a camera module according to an embodiment of the present invention.

Referring to FIG. 8, the camera module includes an image sensor 210, an image signal processing unit 220, a display unit 230, a first lens driving unit 240, a second lens driving unit 250, a storage unit 260, and a control unit 270.

As described above, the image sensor 210 processes an optical image of a subject formed via a lens. To this end, the image sensor 210 may preprocess the image acquired via the lens. In addition, the image sensor 210 may convert the preprocessed image into electrical data to output it.

The image sensor 210 has a form in which a plurality of photo detectors are integrated as each pixel, and converts image information of the subject into electrical data to output it. The image sensor 210 accumulates an input light amount, and outputs an image captured by the lens according to the accumulated light amount in accordance with a vertical synchronization signal. At this time, image acquisition is performed by the image sensor 210 to convert light reflected from the subject into an electrical signal. Meanwhile, a color filter is required in order to acquire a color image using the image sensor 210, and for example, a color filter array (CFA) filter may be adopted. The CFA passes only light representing one color per one pixel, has a regularly arranged structure, and has various forms depending on the arrangement structure.

The image signal processing unit 220 processes an image output via the image sensor 210 on a frame-by-frame basis. In this case, the image signal processing unit 220 may also be referred to as an image signal processor (ISP).

In this case, the image signal processing unit 220 may include a lens shading compensation unit (not shown). The lens shading compensation unit is a block for compensating for a lens shading phenomenon that appears differently in a light amount of a center and an edge region of an image, and the lens shading compensation unit receives a lens shading setting value from the control unit 270 to be described later, and compensates a color of the center and the edge region of the image.

In addition, the lens shading compensation unit may receive shading variables set differently according to a type of lighting, and may also process the lens shading of the image according to the received variables. Accordingly, the lens shading compensation unit may perform a lens shading process by applying a different degree of shading according to the type of lighting. Meanwhile, the lens shading compensation unit may receive shading variables set differently according to an automatic exposure weighting value applied to a specific region of the image to prevent a saturation phenomenon occurring in the image, and may process the lens shading of the image according to the received variable. More clearly, the lens shading compensation unit compensates for a change in brightness that occurs in the edge region of the image signal in response to application of the automatic exposure weighting value to the central region of the image signal. That is, when the image signal is saturated by the lighting, since light intensity decreases concentrically from the center to the outside, the lens shading compensation unit amplifies an edge signal of the image signal to compensate for the brightness compared with the center.

Meanwhile, the image signal processing unit 220 may measure contrast of the image acquired via the image sensor 210. That is, the image signal processing unit 220 may measure the contrast of the image to check focus accuracy of the image acquired via the image sensor 210. The contrast may be measured for each image acquired according to a location of a focus lens.

The display unit 230 displays an image captured by a control of the control unit 270 which will be described later, and displays a setting screen required for taking a picture or a screen for selecting an operation of a user.

The first lens driving unit 240 moves a first lens. In this case, the first lens may include a first lens group included in the first lens assembly as described above, and may be a zoom lens preferably. The first lens driving unit 240 may move the zoom lens in the optical axis direction to adjust a zoom position (or zoom magnification) of the zoom lens.

The second lens driving unit 250 moves a second lens. In this case, the second lens may include a second lens group included in the second lens assembly as described above, and may be a focus lens preferably. The second lens driving unit 250 may move the focus lens in the optical axis direction to adjust a focus position of the focus lens.

The storage unit 260 stores data required for the camera module 100 to operate. In particular, the storage unit 260 may store information on the zoom position and the focus position for each distance to the subject. That is, the focus position may be a position of the focus lens for accurately focusing the subject. The focus position may change according to the zoom position of the zoom lens and the distance to the subject. Therefore, the storage unit 260 stores the data for the zoom position and the focus position corresponding to the zoom position according to the distance.

In this case, the stored data may be sampling data, not data about all zoom positions and focus positions respectively corresponding to all the zoom positions. The sampling data may be at least two location values of a zoom position corresponding to a specific sampling point among all the zoom positions and a focus position corresponding to the zoom position of the sampling point.

In other words, in the present embodiment, data for all zoom positions/focus positions by distance may not be stored, but only data for zoom positions/focus positions for a specific location point (which may be referred to as a sampling point) set by distance may be stored. Accordingly, in the present invention, it is possible to minimize a size of a memory, thereby reducing a manufacturing cost.

In addition, in the present invention, interpolated data is acquired using the sampling data, and the zoom position and the focus position according to the distance may be adjusted by applying the interpolated data.

That is, when the information of the distance to the subject is acquired and the zoom position is changed accordingly, the focus lens should be moved to a focus position corresponding to the distance information and the zoom position. At this time, in the present invention, the data for the zoom position and the focus position for all points is not stored in the storage unit 260, but only the sampling data for the zoom position and the focus position for the specific sampling point is stored. Therefore, in the present invention, interpolated data for a zoom position and a focus position for another point located between the sampling points is acquired by an interpolation. In addition, when the interpolated data is acquired, the focus position of the focus lens and the zoom position of the zoom lens are adjusted by using the acquired interpolated data.

The control unit 270 controls an overall operation of the camera module. In particular, the control unit 270 stores the sampling data in the storage unit 260. To this end, the control unit 270 determines a sampling point with the smallest error from actual data, and acquires sampling data corresponding to the determined sampling point.

In addition, when the sampling data is acquired, the control unit 270 acquires the interpolated data using the sampling data, and applies the acquired interpolated data so as to adjust the zoom position and the focus position according to the distance to the subject.

In this case, the interpolated data should not be different from the actual data. Here, the actual data may be data for an accurate location value of the zoom lens and location value of the focus lens according to the distance to the subject. That is, the actual data is data for an accurate focus position or zoom position according to a zoom position or a focus position for each distance acquired through experiments. In this case, when the actual data is acquired, it may be most ideal to store all the actual data in the storage unit 260 in order to improve the moving accuracy of the lens. However, as described above, when the actual data within the entire range is stored in the storage unit 260, there is a problem that the memory size is increased and the manufacturing cost is increased.

Therefore, in the present invention, a sampling point for acquiring interpolated data having almost no difference with the actual data is determined, and only the sampling data corresponding to the determined sampling point is stored in the storage unit 260.

In this case, in order to minimize an error range between the interpolated data and the actual data, an interval of an optimal sampling point should be determined. That is, in order to minimize the error range between the interpolated data and the actual data, a position of the optimal sampling point and a number of sampling points should be determined.

Therefore, the control unit 270 determines the sampling point capable of minimizing a difference with the interpolated data by using the actual data, and acquires sampling data corresponding to the determined sampling point so as to store it in the storage unit 260. Determination of the sampling point and acquisition of the sampling data according thereto will be described in detail below.

In addition, the first lens driving unit 240 and the second lens driving unit 250 may be driven by a spring base or a ball base, and accordingly, characteristics may be changed according to a number of times of use. In other words, force or elasticity generated by the first lens driving unit 240 and the second lens driving unit 250 may change according to the number of times of use, and accordingly, the position of the zoom lens or the focus lens may change according to the number of times of use under the same conditions.

Therefore, when an accurate focus position for the focus lens is acquired through an auto focusing function, the control unit 270 compares the acquired focus position with the focus position included in the sampling data or the interpolated data.

In addition, when a difference between the compared focus positions is within a preset allowable range, the control unit 270 ignores it, and when the difference is out of the allowable range, the control unit 270 updates the data stored in the storage unit 260 with data corresponding to the acquired new zoom position and focus position.

In this case, only the sampling data is stored in the storage unit 260. The updated data may be data of another point, not the sampling point corresponding to the sampling data. Therefore, when the data is updated, the updated data may be stored additionally in the storage unit 260 together with the sampling data.

Hereinafter, a process of acquiring the sampling data, the interpolated data, and the updated data will be described in detail with reference to the accompanying drawings.

Figure 9:
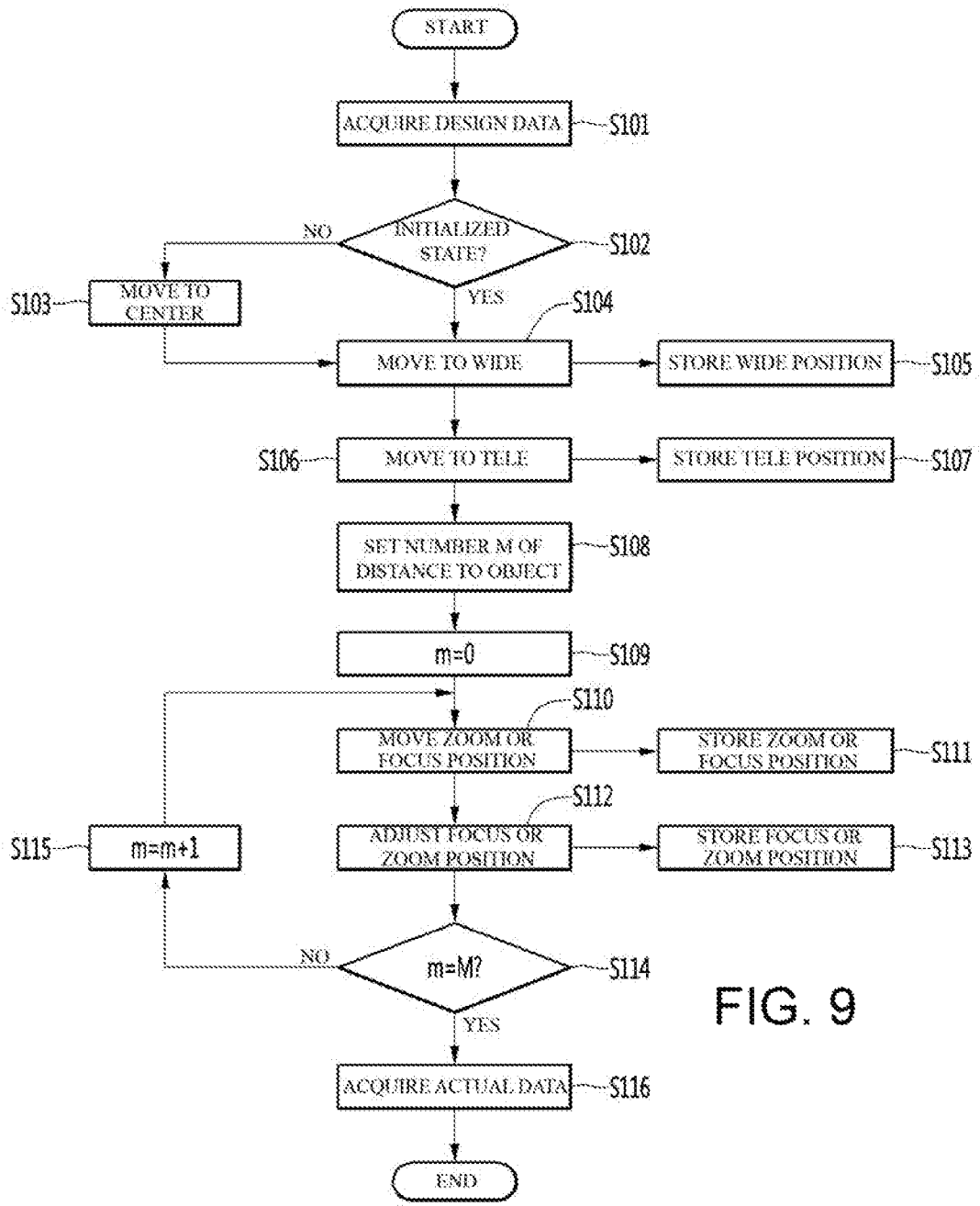
FIG. 9 is a flowchart for step by step description of a method of acquiring actual data according to an embodiment of the present invention.
Figure 10A:
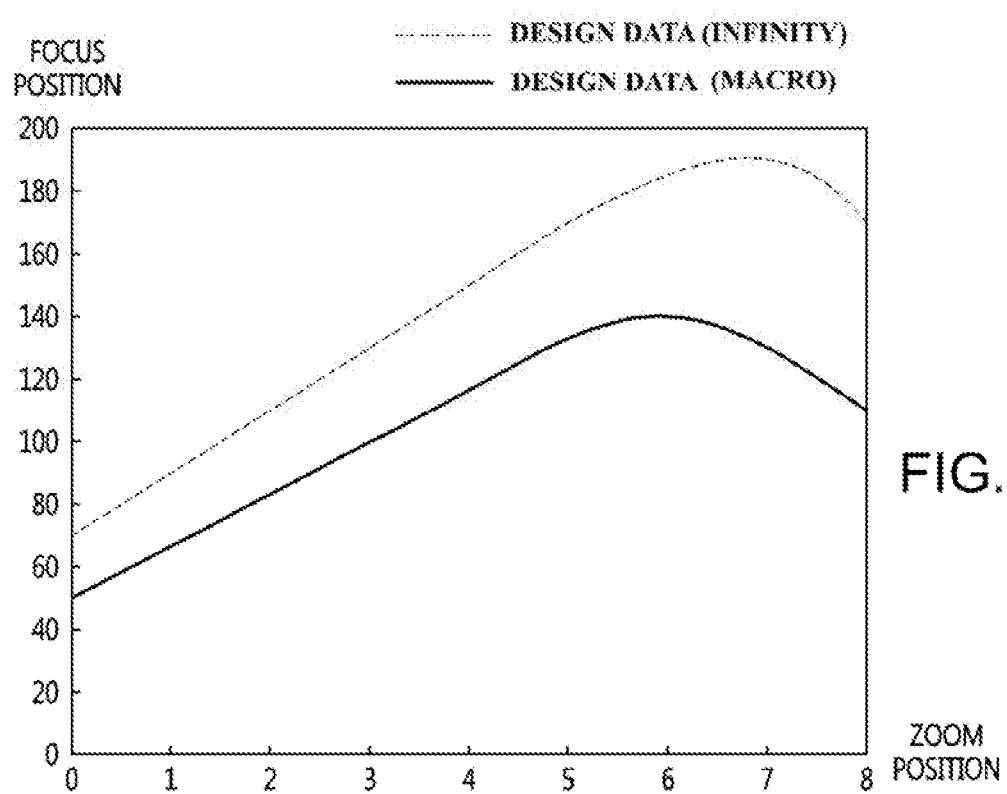
FIG. 10A is a graph showing design data according to an embodiment of the present invention.
Figure 10B:
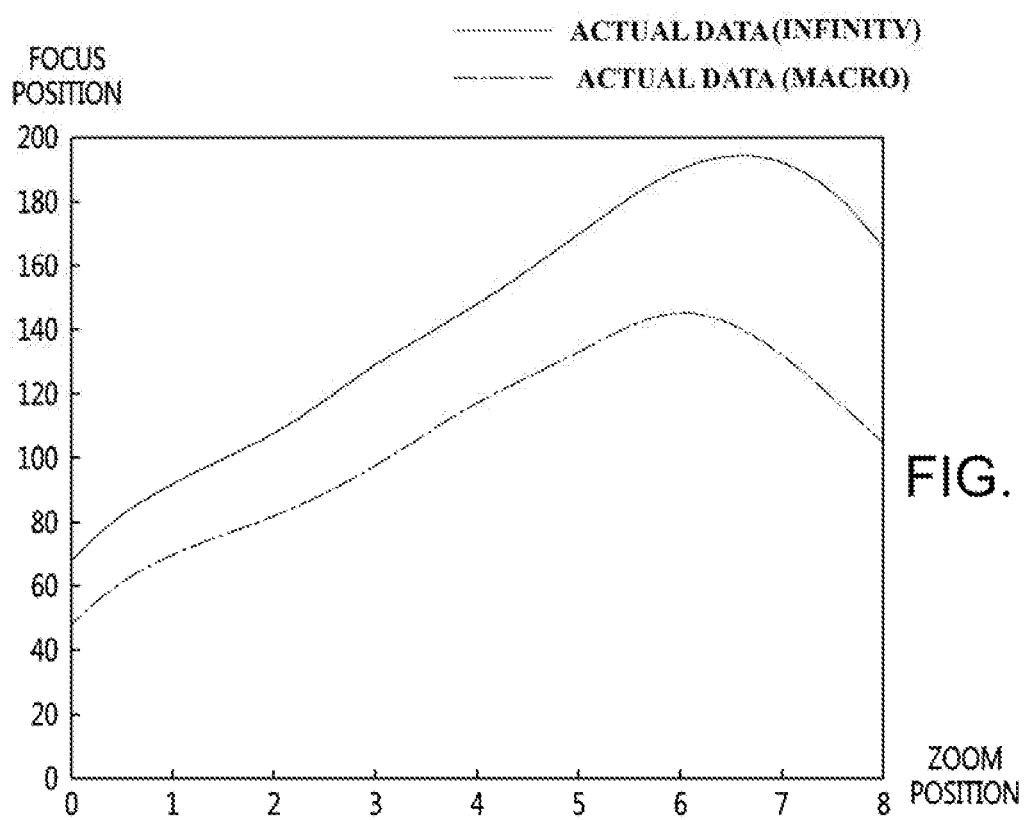
FIG. 10B is a graph showing actual data according to an embodiment of the present invention.

FIG. 9 is a flowchart for step by step description of a method of acquiring actual data according to an embodiment of the present invention, FIG. 10A is a graph showing design data according to an embodiment of the present invention, FIG. 10B is a graph showing actual data according to an embodiment of the present invention, and FIG. 100 is a comparison graph of design data and actual data according to the embodiment of the present invention.

First, a control unit 270 acquires design data at an initial step for acquiring actual data (step 101). The design data is reference data acquired when a zoom lens and a focus lens included in a camera module are designed.

That is, the design data theoretically includes information on a zoom position of the zoom lens and a focus position of the focus lens according to a distance. Accordingly, the design data may be referred to as reference data, and may also be referred to as theoretical data.

The design data has a reference zoom lens and a reference focus lens as reference in a design process of the camera module, and it is theoretical data that when the zoom position of the reference zoom lens is 'A' according to the distance and the focus position of the reference focus lens is 'B', an accurate focus may be achieved.

Therefore, in the actual use environment of the camera module, when the zoom position and the focus position move under the same conditions as the design data, the accurate focus may not be achieved. Therefore, in the present invention, the design data is used to acquire the actual data for accurate focusing in an actual usage environment of the camera module.

Meanwhile, in the related art, when the actual data is acquired, information on all zoom positions and focus positions according to all distances is stored as it is in the storage unit, and it is used as calibration data to provide an auto focusing function. However, in such a case, not only a size of a memory was increased, but also accurate lens position control was not possible in various usage environments of the camera module only with the design data. In addition, in the related art, only the focus lens excluding the zoom lens was included. Accordingly, in the related art, the auto focusing function may be realized only with data corresponding to a distance to a subject and a position of the zoom lens according to the distance.

However, the camera module of the present invention includes not only the focus lens but also the zoom lens. Accordingly, in order to move to the accurate position of the lens, it is necessary to know three pieces of information such as the distance to the subject, the zoom position of the zoom lens, and the focus position of the focus lens. In this case, the distance to the subject may be acquired by using a distance measuring device (e.g., a laser diode) provided in the camera module. However, it is not possible to know the accurate zoom position of the zoom lens and the focus position of the focus lens by using only the distance to the subject. Therefore, in the present invention, the design data is used to acquire accurate actual data suitable for the actual usage environment of the camera module.

Meanwhile, referring to FIG. 10A, the design data includes a plurality of pieces of design data. In other words, the design data includes first data corresponding to the zoom position and the focus position applied to a first distance and second data corresponding to the zoom position and the focus position applied to a second distance. In this case, the first distance may be infinity, and the second distance may be a macro. Meanwhile, although it is shown in the drawing that the design data includes only the data for the zoom position and the focus position corresponding to the two distances, the distances could be increased more. That is, some models of the camera module require only data for two distances as described above, and alternatively, there are models that require data for three or more distances. Therefore, the number of distances may be set differently depending on the model.

Referring again to FIG. 9, when the design data is acquired, the control unit 270 determines whether the zoom lens is in an initialized state (step 102). That is, the control unit 270 may proceed with a process for confirming a magnification of the zoom lens. To this end, the control unit 270 determines whether the zoom lens is located at a center position.

In addition, when the zoom lens is located at a position other than the center position, the control unit 270 moves the zoom lens to the center (step 103).

Thereafter, the control unit 270 moves the zoom lens to a wide end (step 104), and stores position information (referred to as wide position information) of the zoom lens moved to the wide end in the storage unit 260 (Step 105).

When a confirmation process for the wide position is completed, the control unit 270 moves the zoom lens to a TELE end (step 106), and stores position information (referred to as Tele position information) on the zoom lens moved to the TELE end in the storage unit 260 (step 106).

Thereafter, the control unit 270 sets a number M of distances to an object (step 108). In this case, as set above, the number M of distances may be set to two, such as infinity and macro, or alternatively, it may be set to three or more, including the distance between infinity and macro.

In addition, the control unit 270 sets a distance of a subject based on the set number M of distances (step 109). That is, when the distance is set first, the control unit 270 may set the distance of the subject to the closest distance (m=0).

Thereafter, the control unit 270 moves the position of the zoom lens or the focus lens by using the design data corresponding to the set distance of the subject. At this time, the design data includes information on the focus position and the zoom position corresponding to the set distance. At this time, the control unit 270 may apply any one of the focus position and the zoom position included in the design data, and may adjust a position of the other one accordingly to proceed with a process of confirming the accurate focus lens and the lens position.

In this case, for accurate lens position control, whether the zoom position has a greater impact or the focus position has a greater impact is varied depending on the distance of the subject. For example, the focus position may have a greater impact on accurate lens position control at a short distance, and the zoom position may have a greater impact on accurate lens position control at a long distance. Therefore, in the present invention, when acquiring actual data for the short distance, the zoom position of the zoom lens of the design data is applied, and accordingly, the focus position of the focus lens may be adjusted to track the accurate focus position. In the present invention, when acquiring the actual data for the long distance, the focus position of the focus lens of the design data is applied, and accordingly, the zoom position of the zoom lens may be adjusted to track the accurate zoom position.

Hereinafter, a case in which the set distance of the subject is a short distance will be described below.

When the distance of the subject is set, the control unit 270 extracts data corresponding to the set distance from the design data. The control unit 270 acquires zoom position information of the zoom lens from the extracted data, and moves the zoom position of the zoom lens based thereon (step 110). At this time, when the zoom position of the zoom lens is moved, the control unit 270 stores information on the moved zoom position in the storage unit 260 (step 111).

Thereafter, the control unit 270 adjusts the focus position of the focus lens in a state in which the zoom lens is fixed at the moved zoom position to track the accurate focus position (step 112). To this end, the control unit 270 may move the focus lens by using the focus position corresponding to the zoom position from the data acquired from the design data. Then, when the focus is not accurate in a state in which the focus lens is moved based on the design data, the control unit 270 adjusts the focus position to track the accurate focus position (step 112). When the focus position is tracked, the control unit 270 stores the tracked focus position (step 113).

At this time, the control unit 270 tracks all the zoom positions and the focus positions corresponding thereto with respect to the set subject distance, and stores them as actual data corresponding to the subject distance in the storage unit 260.

Thereafter, the control unit 270 determines whether or not the actual data has been acquired with respect to all the subject distances. Then, when the actual data for all the subject distances are not acquired, the control unit 270 proceeds with an acquisition process of the actual data corresponding to the next subject distance.

That is, when the next distance of the subject is set (e.g., when set to a long distance), the control unit 270 extracts data corresponding to the set distance from the design data. Then, the control unit 270 acquires the focus position information of the focus lens from the extracted data, and moves the focus position of the focus lens based thereon. At this time, when the focus position of the focus lens moves, the control unit 270 stores the information on the moved focus position in the storage unit 260. Thereafter, the control unit 270 adjusts the zoom position of the zoom lens in a state in which the focus lens is fixed at the moved focus position to track the zoom position in which the focus is accurate at the focus position. To this end, the control unit 270 may move the zoom lens by using the zoom position corresponding to the focus position from the data acquired from the design data. When the zoom lens is moved based on the design data, and the focus is not accurate, the control unit 270 adjusts the zoom position to track the accurate zoom position. Then, when the zoom position is tracked, the control unit 270 stores the tracked zoom position.

As described above, in the present invention, it is possible to determine whether to apply the zoom position as a fixed value, or to apply the focus position as a fixed value in the design data according to the distance to the subject. In addition, in the present invention, it is possible to track the accurate lens position while changing the focus position or the zoom position based on the determined fixed value. Then, when the accurate lens position is tracked, information on the focus position and the zoom position corresponding thereto is stored as actual data. Here, the actual data may be first data including the location value of the zoom lens and the location value of the focus lens that is in focus in correspondence with the location value of the zoom lens.

Referring to FIG. 10B, the actual data may consist of information on the zoom position and the focus position that is in focus in correspondence therewith according to the distance to the subject. At this time, any one of the zoom position and the focus position of the actual data may have the same value as the actual data, and the other may be the same as or different from the actual data. This is because the design data acquired theoretically may differ from the actual data for the accurate lens position in the actual usage environment of the camera module.

Figure 10C:
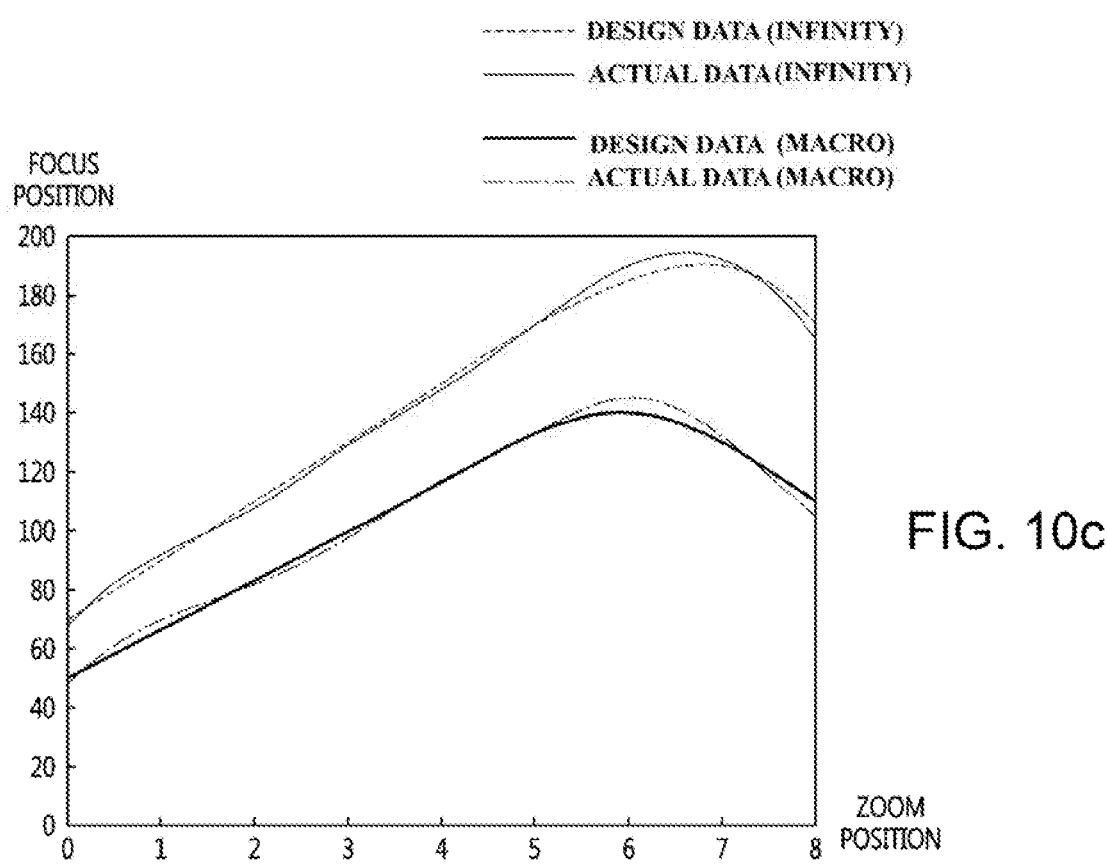
FIG. 10O is a comparison graph of design data and actual data according to the embodiment of the present invention.

Referring to FIG. 10C, it may be confirmed that there is a certain difference between the actual data and the design data according to the distance. That is, it may be confirmed that a graph of the design data for the zoom position and the focus position at the infinite distance and a graph of the actual data do not coincide at all points. In addition, it may be confirmed a graph of the design data for the zoom position and the focus position at the macro distance and a graph of the actual data do not coincide at all points.

Accordingly, when the lens position is controlled by applying the design data as it is in the actual usage environment of the camera module, it may be confirmed that accuracy of the accurate lens position is lowered.

Therefore, in the present invention, the actual data for more accurate lens position control is acquired by using the design data.

Hereinafter, a process of acquiring sampling data to be stored in the storage unit 260 according to an embodiment of the present invention will be described.

Figure 11:
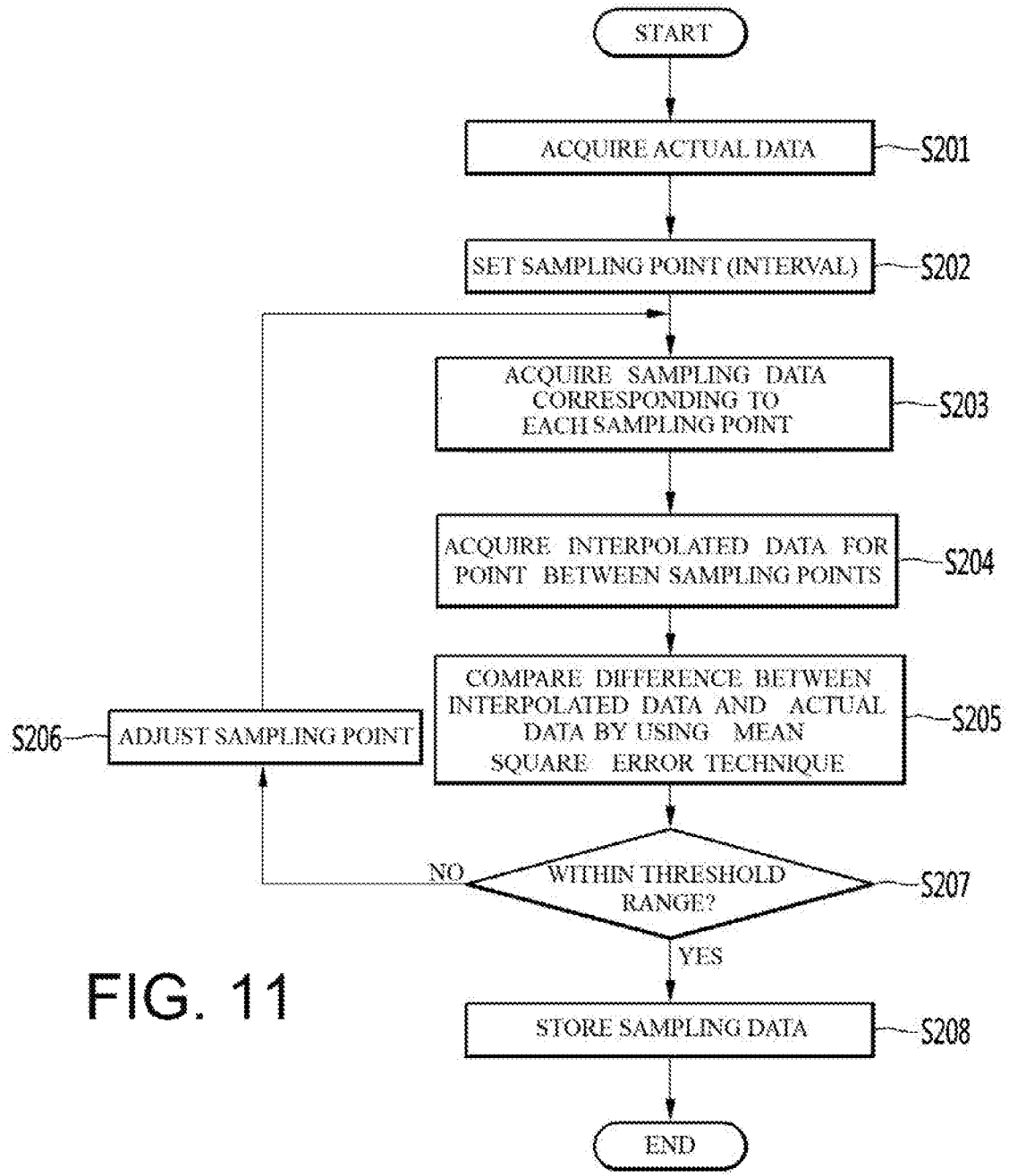
FIG. 11 is a flowchart for step by step describing a method of acquiring sampling data of a camera module according to an embodiment of the present invention.
Figure 12A:
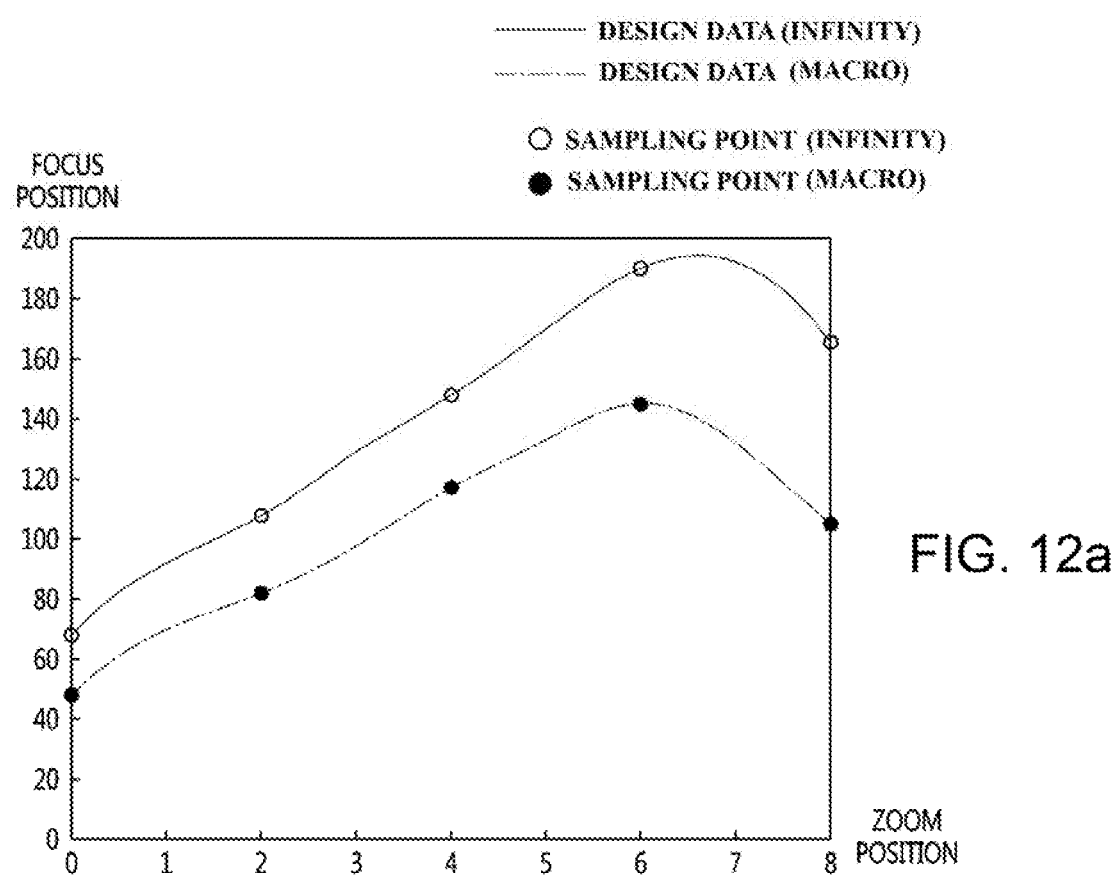
FIG. 12A is a view for describing sampling points according to an embodiment of the present invention.
Figure 12B:
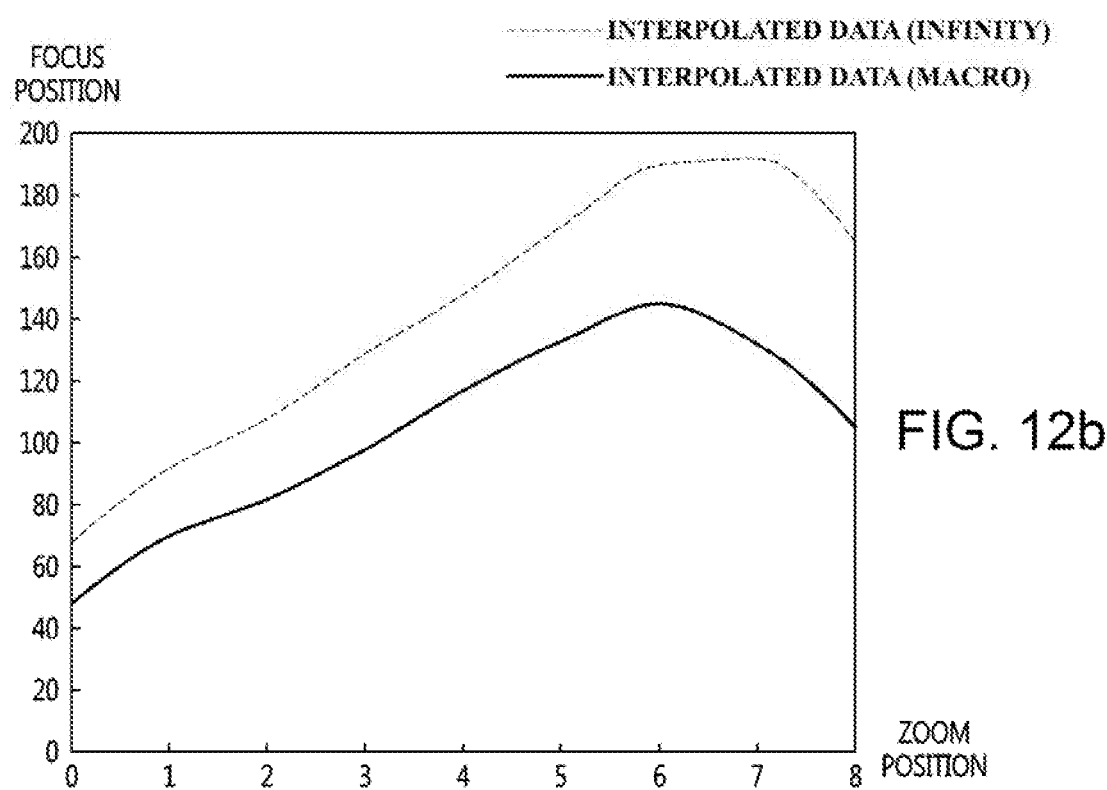
FIG. 12B is a graph showing interpolated data acquired based on the sampling points of FIG. 12A.
Figure 12C:
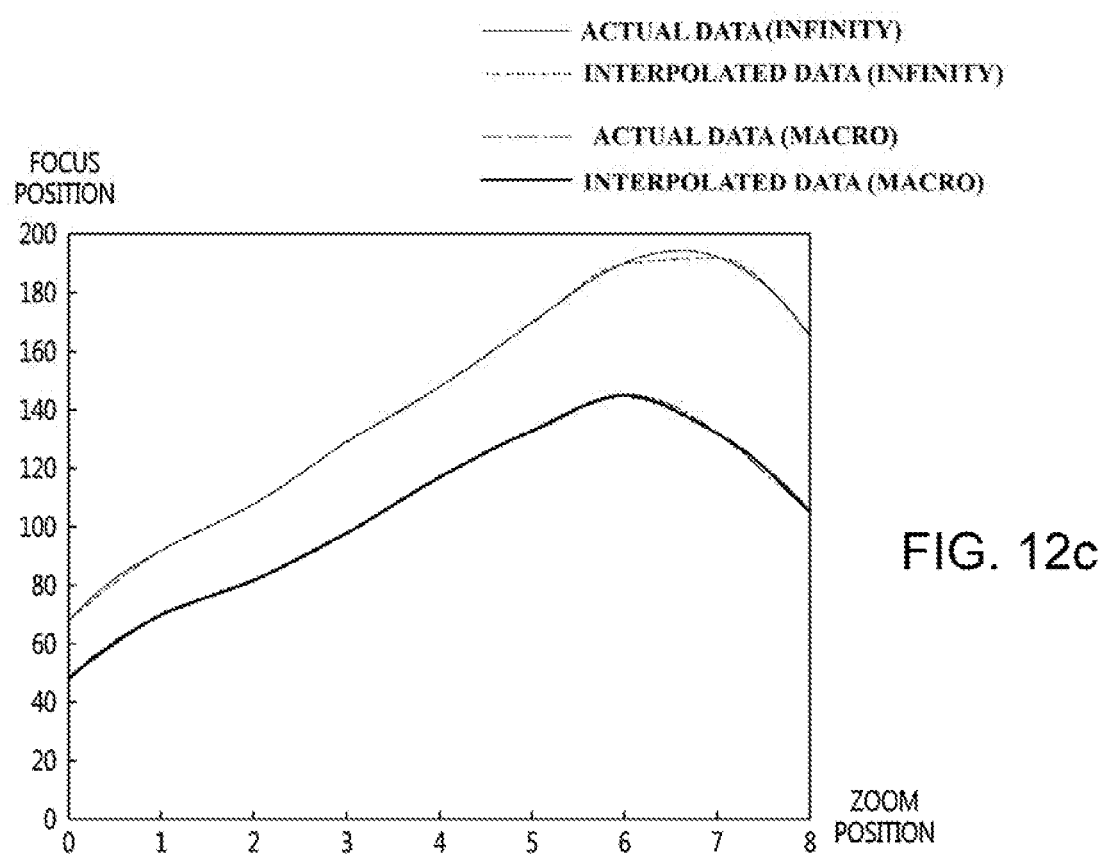
FIG. 12C is a graph showing a difference between actual data and the interpolated data according to the embodiment of the present invention.

FIG. 11 is a flowchart for step by step describing a method of acquiring sampling data of a camera module according to an embodiment of the present invention. FIG. 12A is a view for describing sampling points according to an embodiment of the present invention, FIG. 12B is a graph showing interpolated data acquired based on the sampling points of FIG. 12A, and FIG. 12C is a graph showing a difference between actual data and the interpolated data according to the embodiment of the present invention.

Referring to FIG. 11, the control unit 270 acquires the actual data corresponding to a number of distances set through the process as shown in FIG. 9 (step 201). The actual data may include two pieces of actual data corresponding to two distances. That is, the actual data may include first actual data corresponding to an infinite distance and second actual data corresponding to a macro distance.

Subsequently, the control unit 270 sets a location point for each of the actual data (step 202). Here, the location point may be referred to as a sampling point. In addition, the sampling point may be set with reference to the zoom position, and may preferably be set at an interval with respect to the zoom location point.

That is, referring to FIG. 12A, it can be seen that the zoom position exists from 0 to 8. In addition, the sampling interval may be set to 2, and accordingly, the sampling point may be set to '0', '2', '4', '6' and '8' based on the zoom position. In other words, the sampling interval may be set to '2' as a default value. Accordingly, since the zoom positions exist from 0 to 8, the sampling points may be set to five.

In this case, the same sampling interval is set for each of an infinity distance and a macro distance in FIG. 12A, but the sampling interval may be set differently according to each distance. It may be changed based on a difference between the interpolated data and the actual data acquired through an interpolation later.

Referring again to FIG. 11, when the sampling point is determined, the control unit 270 acquires sampling data for each of the sampling points by using the previously acquired actual data (step 203). That is, the control unit 270 acquires the zoom position and the focus position for each of the sampling points by using the actual data. Here, the sampling data may include a location value with respect to the location point of the zoom lens corresponding to the sampling points and a location value of the focus lens that is in focus correspondingly.

Thereafter, the control unit 270 acquires second data at remaining points other than the sampling points by using the sampling data for the zoom position and the focus position acquired with respect to the sampling point (step 203). That is, the control unit 270 acquires the interpolated data for zoom positions and focus positions of the remaining points other than the sampling points by applying any one of a plurality of interpolations. That is, the second data may be referred to as the interpolated data.

In this case, the plurality of interpolations may include linear interpolation, polynomial interpolation, spline interpolation, exponential interpolation, log_linear interpolation, Lagrange interpolation, Newton interpolation, and bilinear interpolation.

The linear interpolation is the simplest method among various interpolations, and estimates a function value by assuming that a function to be known is a linear function. In addition, the polynomial interpolation has a second or more polynomial, and since the degree of the polynomial increases as a number of data points increases, complexity of calculation increases. The spline interpolation uses low-order polynomials in each period. The polynomial used in the spline interpolation may be selected to be naturally connected to the polynomials in front and rear periods, and at this time, front and rear spline functions at each point should be differentiable and have the same curvature.

Accordingly, in the present invention, any one specific interpolation is selected from the various interpolations as described above, and interpolated data for points other than the sampling points is acquired by using this selected interpolation.

That is, referring to FIG. 11B, the control unit 270 acquires interpolated data for a zoom position and a focus position of points other than the sampling points by applying the determined specific interpolation. At this time, the interpolated data may not have the same value as the actual data at all points, and may have different values at specific points.

Referring again to FIG. 10, the control unit 270 applies the technique of mean square error, and compares a difference between the acquired interpolated data and the actual data (step 204). That is, the control unit 270 compares a degree of difference between the focus position according to the zoom position of the interpolated data and the focus position according to the zoom position of the actual data for each of the points.

Subsequently, the control unit 270 determines whether the difference between the interpolated data and the actual data for each point is within a threshold range (step 204). In other words, the control unit 270 determines whether the difference value between the interpolated data and the actual data is within a threshold value for each of the points.

Thereafter, when the difference between the interpolated data and the actual data is out of the threshold range, the control unit 270 adjusts the determined sampling point (step 206), and accordingly, the process returns to step 203, and the process of acquiring the sampling data for the adjusted sampling point and the process of acquiring the interpolated data accordingly are performed again.

At this time, the control unit 270 may adjust the sampling interval to adjust the sampling point. In other words, the control unit 270 may reset the sampling interval at an interval smaller than a previously set sampling interval, and may reset the sampling point according to the reset sampling interval. For example, the adjusted sampling interval may be '1.5', and accordingly, the sampling point may be reset with '0', '1.5', '3.0', '4.5', '6.0', and '7.5' with respect to the zoom position.

Meanwhile, in another embodiment of the present disclosure, the control unit 270 may first proceed with a process of changing the applied interpolation before adjusting the sampling point. In other words, when the previously applied interpolation is the polynomial interpolation, the spline interpolation may be performed again to acquire again interpolated data based on the previously acquired sampling data. In addition, when the difference between the interpolated data acquired based on the newly applied interpolation and the actual data is out of the threshold range as before, the process of adjusting the sampling point may be proceeded by entering step 206.

Meanwhile, when the difference between the interpolated data and the actual data is within the threshold range, the control unit 270 stores the sampling data and the interpolation information used to acquire the interpolated data in the storage unit 260.

That is, referring to FIG. 12C, the control unit 270 acquires interpolated data for each distance. At this time, it may be confirmed that the interpolated data has almost no difference from the actual data.

In an embodiment according to the present invention, only sampling data corresponding to a zoom position and a focus position corresponding to a specific sampling point is stored in a memory. Accordingly, in the present invention, it is possible to minimize a size of the memory, thereby reducing a manufacturing cost.

In addition, in the embodiment according to the present invention, interpolated data for points other than sampling points is acquired by using an interpolation. Then, the sampling points are adjusted based on a difference between the interpolated data and the actual data. At this time, the sampling points may be adjusted by adjusting a sampling interval to adjust a number of sampling points accordingly. In addition, in a usage environment of a camera module, an auto focusing function is provided by applying the interpolated data in which the difference from the actual data is minimized. Therefore, in the present invention, a lens may be moved to an accurate position even with minimum sampling data by performing the auto focusing function using the interpolated data that is not different from the actual data, thereby improving reliability of a product.

Figure 13:
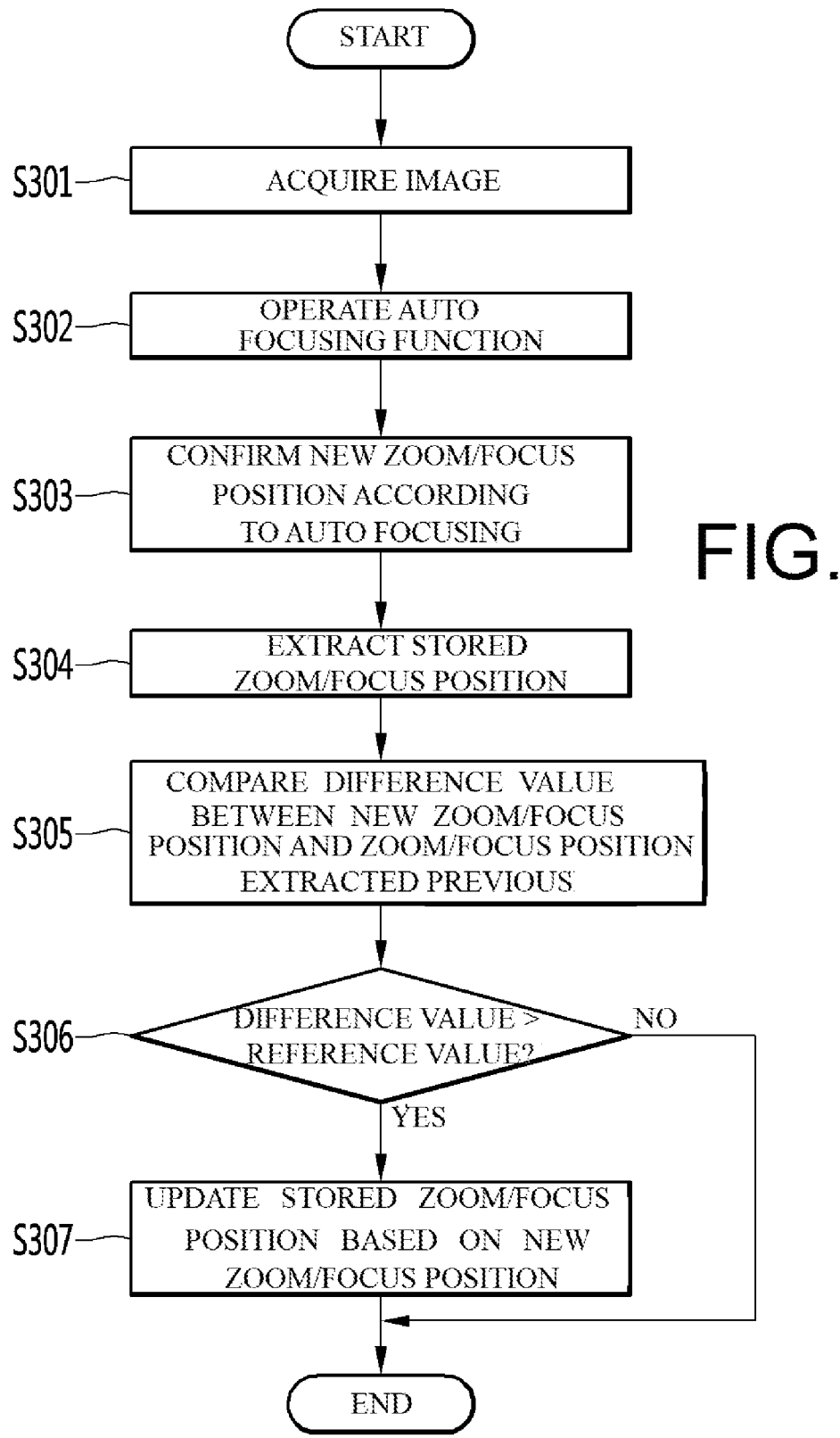
FIG. 13 is a flowchart for step by step describing a method of data updating of a camera module according to an embodiment of the present invention.
Figure 14A:
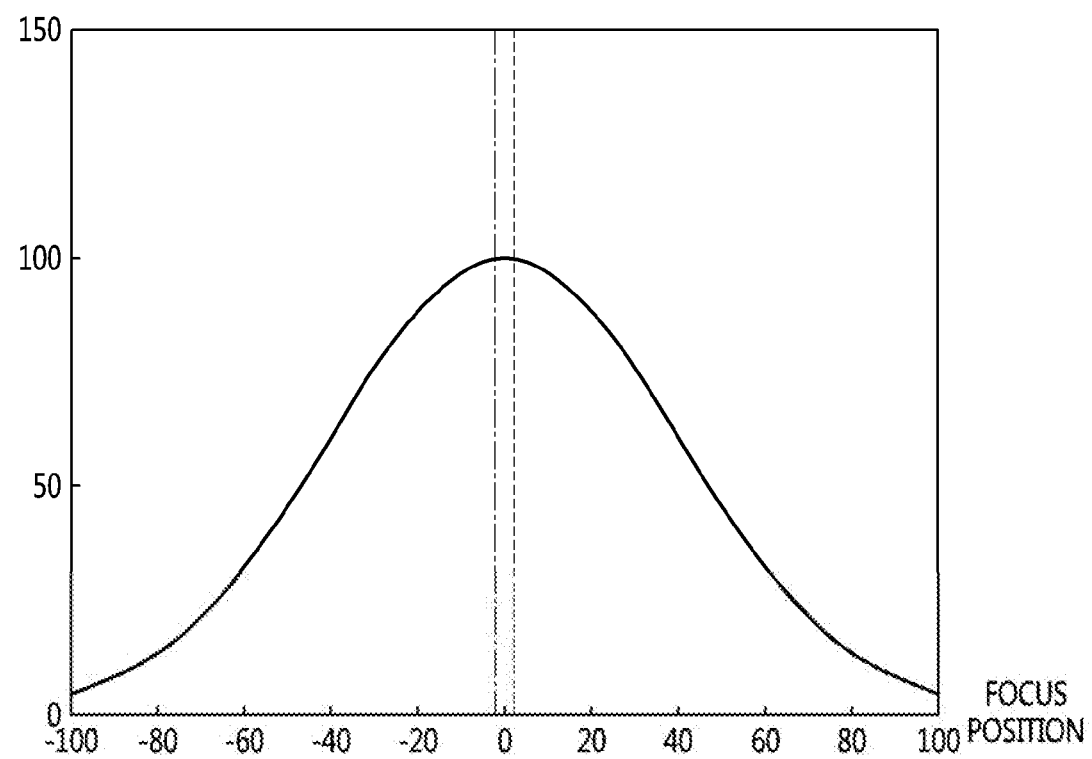
FIG. 14A is a view for describing a criteria of data updating according to an embodiment of the present invention.
Figure 14B:
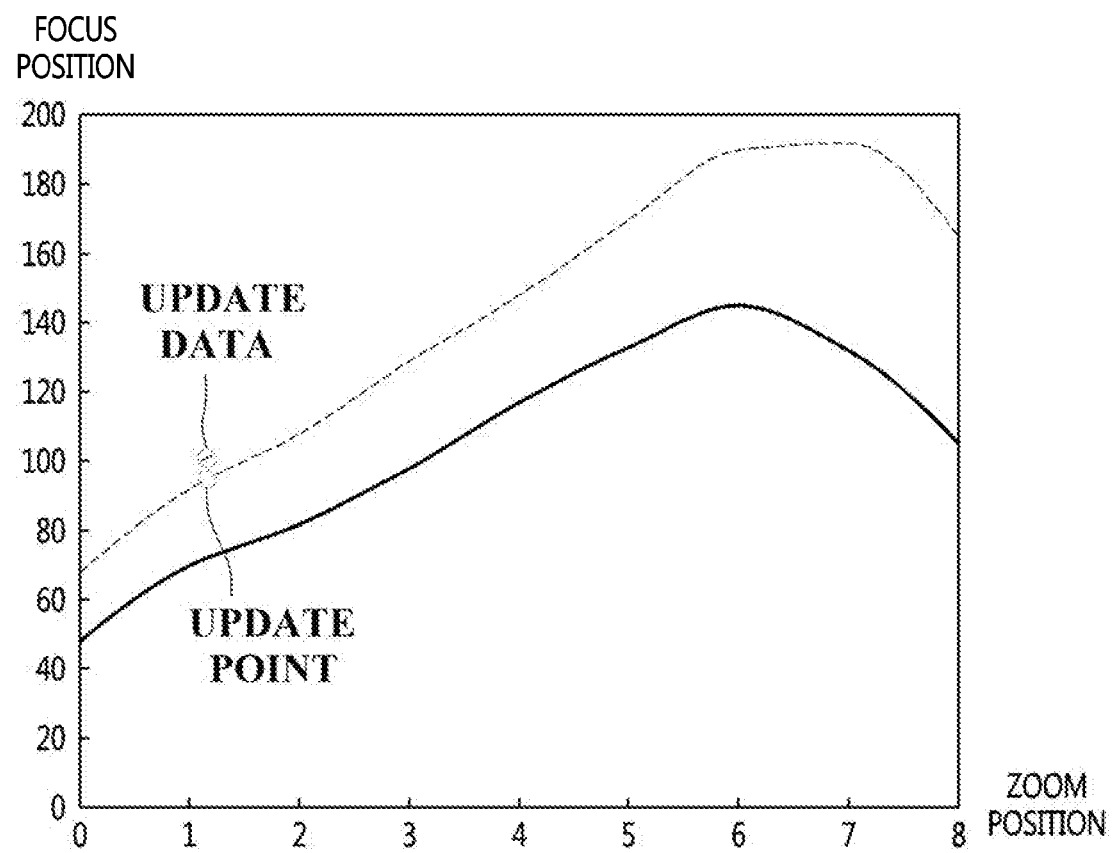
FIG. 14B is a view for describing updated data according to the embodiment of the present invention.

FIG. 13 is a flowchart for step by step describing a method of data updating of a camera module according to an embodiment of the present invention, FIG. 14A is a view for describing a criteria of data updating according to an embodiment of the present invention, and FIG. 14B is a view for describing updated data according to the embodiment of the present invention.

Referring to FIG. 13, in the usage environment of the camera module, the control unit 270 acquires sampling data stored in the storage unit 260 and interpolated data based on the sampling data. In addition, the control unit 270 changes the focus position and zoom position of the focus lens and zoom lens by using the acquired interpolated data. Accordingly, the image sensor 210 acquires an image formed by changing the position of the focus lens and the zoom lens (step 301).

At this time, the image to be imaged may be an image that is in focus, or may be an image that is not in focus.

Accordingly, the control unit 270 operates an auto focusing function to move the position of the focus lens (step 302). At this time, the control unit 270 moves the focus lens according to the operation of the auto focusing function so as to acquire a contrast value of the image accordingly. At this time, the focus position at a point in which the contrast value is the highest may be an optimal focus position. In this case, the optimal focus position may be different from the focus position applied through the interpolated data. This is because it is difficult to determine the focus position of the focus lens as the optimal position in the spring base or the ball base as described above, and accordingly, the focus position is determined within a certain error range.

Therefore, the control unit 270 extracts the zoom position and the focus position corresponding to the interpolated data applied before the auto focusing function is performed (step 304).

In addition, the control unit 270 compares a difference value between an optimal zoom position and focus position applied according to the operation of the auto focusing function and the zoom position and the focus position extracted from the interpolated data (step 305).

Thereafter, the control unit 270 determines whether the difference value is greater than a preset reference value (step 306).

In addition, when the difference value is greater than the reference value, the control unit 270 updates the interpolated data by using data for a zoom position and a focus position newly acquired according to the auto focusing (step 307).

At this time, the update criteria of the interpolated data may be as follows.

Referring to FIG. 14A, the focus position of the focus lens is moved a state in which the zoom lens is fixed by performing the auto focusing operation, and an image contrast value may be acquired accordingly. In addition, when a contrast value of the image acquired according to the zoom position and the focus position applied through the interpolated data is included in two dotted lines in FIG. 14A, the interpolated data may be maintained as it is. Alternatively, when the contrast value of the image according to the zoom position and the focus position applied through the interpolated data is out of the two dotted lines, data for the corresponding point may be updated.

That is, as shown in FIG. 14B, when the contrast value of the image acquired by applying the focus position of the interpolated data at the zoom position '1' is outside an allowable range within the two dotted lines in FIG. 14A, the control unit 270 may update the data for the corresponding point with a new value acquired through the auto focusing function. Accordingly, the update point may be a zoom position of the '1' position, and the data for the point is updated based on the data for an optimal focus position tracked according to movement of the focus position. At this time, data stored in the storage unit 260 is sampling data. In addition, the control unit 270 acquires interpolated data based on the sampling data to control the zoom position and the focus position. Accordingly, data for the update point may not be stored in the storage unit 260. Therefore, the control unit 270 may store information on the zoom position and the focus position of the update point in the storage unit 260.

In an embodiment according to the present invention, only sampling data corresponding to a zoom position and a focus position corresponding to a specific sampling point is stored in a memory. Accordingly, in the present invention, it is possible to minimize a size of the memory, thereby reducing a manufacturing cost.

In addition, in the embodiment according to the present invention, interpolated data for points other than sampling points is acquired by using an interpolation. Then, the sampling points are adjusted based on a difference between the interpolated data and the actual data. At this time, the sampling points may be adjusted by adjusting a sampling interval to adjust a number of sampling points accordingly. In addition, in a usage environment of a camera module, an auto focusing function is provided by applying the interpolated data in which the difference from the actual data is minimized. Therefore, in the present invention, a lens may be moved to an accurate position even with minimum sampling data by performing the auto focusing function using the interpolated data that is not different from the actual data, thereby improving reliability of a product.

In addition, according to the embodiment of the present invention, when the auto focusing function is performed, it is determined whether or not the previously stored focus position is abnormal based on the contrast of the image. Then, when the contrast corresponding to the stored focus position is out of the preset allowable range, the previously stored data is updated to the data corresponding to the new zoom position and focus position. Therefore, in the present invention, accuracy of the focus position may be improved without being affected by operating characteristics that change according to a number of times of use the camera module.

The characteristics, structures and effects described in the embodiments above are included in at least one embodiment but are not limited to one embodiment. Furthermore, the characteristics, structures, effects, and the like illustrated in each of the embodiments may be combined or modified even with respect to other embodiments by those of ordinary skill in the art to which the embodiments pertain. Thus, it would be construed that contents related to such a combination and such a modification are included in the scope of the embodiments.

The above description has been focused on the embodiment, but it is merely illustrative and does not limit the embodiment. A person skilled in the art to which the embodiment pertains may appreciate that various modifications and applications not illustrated above are possible without departing from the essential features of the embodiment. For example, each component particularly represented in the embodiment may be modified and implemented. In addition, it should be construed that differences related to such changes and applications are included in the scope of the present invention defined in the appended claims.

The invention claimed is:

1. A camera device calibration method comprising:
   acquiring first data indicating a relationship between location values of a zoom lens and location values of a focus lens;
   setting a sampling interval between sampling points of the zoom lens;
   setting at least two location values of the zoom lens as the sampling points based on the sampling interval;
   acquiring sampling data including a location value of the focus lens for each of the sampling points based on the first data;
   acquiring interpolated data for location values of the zoom lens other than the sampling points by applying at least one interpolation method to the sampling data;
   setting the sampling data to a camera including the zoom lens and the focus lens when a difference value obtained by comparing the first data with the interpolated data is within a preset threshold range; and
   changing a location and a number of the sampling points by resetting the sampling interval when the difference value is out of the threshold range.

2. The camera device calibration method of claim 1, further comprising:
   acquiring reference data on a locational relationship between a reference zoom lens and a reference focus lens that is determined at the time of designing the reference zoom lens and the reference focus lens,
   wherein the reference zoom lens and the reference focus lens are lens as reference in a design process of the camera devices; and
   wherein the reference data is theoretical data including location values of the reference zoom lens and location values of the reference focus lens corresponding to the location values of the reference zoom lens.

3. The camera device calibration method of claim 2, wherein acquiring the first data includes:
   moving one of the zoom lens and the focus lens by applying any one of the location values of the reference zoom lens and the location values of the reference focus lens included in the reference data,
   adjusting a location of the other one of the focus lens and the zoom lens to an optimum focusing location once the one of the zoom lens and the focus lens has moved, and
   acquiring the location value of the focus lens or zoom lens of which the location has been adjusted.

4. The camera device calibration method of claim 3, wherein the first data, the interpolated data, and the sampling data are configured to be divided into a plurality of pieces of data according to a distance to a subject.

5. The camera device calibration method of claim 1,
   wherein the location and the number of the sampling points are based on the sampling interval.

6. The camera device calibration method of claim 5, further comprising:
   acquiring a first image using the sampling points,
   wherein acquiring the first image includes:
      extracting a location value of the zoom lens corresponding to a distance to a subject to be photographed;
      acquiring interpolated data by interpolating between the sampling points based on the extracted location value; and acquiring the first image by moving the first zoom lens and the focus lens based on the acquired interpolated data.

7. The camera device calibration method of claim 6, further comprising:
acquiring a second image by re-moving the location of the first focus lens moved with respect to the interpolated data to an optimum focusing location;
comparing a difference value between contrast of the first image and contrast of the second image; and
updating the sampling data when the difference value of contrast is out of a preset reference value.

8. A camera module comprising:
a zoom lens configured to adjust a zoom magnification of a subject;
a focus lens configured to adjust a focus of the subject;
a first lens driver configured to move a location of the zoom lens;
a second lens driver configured to move a location of the focus lens;
a storage unit configured to store sampling data composed of a location values of the zoom lens set as of sampling points and corresponding values of the focus lens; and
a controller configured to acquire the sampling data to store the sampling data in the storage unit and to control the first and second lens drivers by interpolating the stored sampling data,
wherein the controller is configured to:
acquire first data indicating a relationship between location values of the zoom lens and location values of the focus lens,
set a sampling interval between sampling points of the zoom lens,
set at least two location values of the zoom lens as the sampling points based on the sampling interval,
acquire sampling data including a location value of the focus lens for each of the sampling points based on the first data,
acquire interpolated data for location values of the zoom lens other than the sampling points by applying at least one interpolation method to the sampling data,
set the sampling data to a camera including the zoom lens and the focus lens when a difference value obtained by comparing the first data with the interpolated data, is within a preset threshold range; and
change a location and a number of the sampling points by resetting the sampling interval when the difference value is out of the threshold range.

9. The camera module of claim 8, wherein the controller is further configured to acquire reference data on a locational relationship between a reference zoom lens and a reference focus lens that is determined at the time of designing the reference zoom lens and the reference focus lens,
wherein the reference zoom lens and the reference focus lens are lens as reference in a design process of the camera devices, and
wherein the reference data is theoretical data including location values of the reference zoom lens and location values of the reference focus lens corresponding to the location values of the reference zoom lens.

10. The camera module of claim 8, wherein the location and the number of the sampling points are based on the sampling interval, and
wherein the controller is further configured to:
extract a location value of the zoom lens corresponding to a distance to a subject to be photographed;
acquire interpolated data by interpolating between the sampling points based on the extracted location value; and
acquire a first image by moving the zoom lens and the focus lens based on the acquired interpolated data.

11. The camera module of claim 10, wherein the controller is further configured to:
acquire a second image by re-moving the location of the focus lens moved with respect to the interpolated data to an optimum focusing location;
compare a difference value between contrast of the first image and contrast of the second image; and
update the sampling data when the difference value of contrast is out of a preset reference value.

* * * * *